United States Patent [19]
Stone et al.

[11] Patent Number: 5,692,077
[45] Date of Patent: Nov. 25, 1997

[54] OPTICAL TIME SHIFTER AND ROUTING SYSTEM

[75] Inventors: Thomas W. Stone; Michelle S. Malcuit, both of Bethlehem, Pa.

[73] Assignee: Wavefront Research, Inc., Bethlehem, Pa.

[21] Appl. No.: 640,187

[22] Filed: Apr. 30, 1996

[51] Int. Cl.$^6$ .............................. G02B 6/26; G02B 6/42
[52] U.S. Cl. ................................................ 385/16; 385/109
[58] Field of Search ........................... 385/16, 14, 147, 385/17, 18, 24, 132, 4, 5, 37; 359/181, 110, 241, 113; 356/345

[56] References Cited

U.S. PATENT DOCUMENTS

| | | | |
|---|---|---|---|
| 4,871,235 | 10/1989 | Greene et al. | 359/241 |
| 5,133,027 | 7/1992 | Funazaki et al. | 385/4 |
| 5,172,258 | 12/1992 | Verber | 385/132 |
| 5,491,762 | 2/1996 | Decaon et al. | 385/16 |
| 5,546,483 | 8/1996 | Inoue et al. | 385/14 |

OTHER PUBLICATIONS

T. Stone and N. George, "Wavelength Performance of Holographic Optical Elements," Applied Optics, 24, 3797 (1985). No Month.

W. Ng, A. Walston, G. Tangonan, I. Newberg, and J. J. Lee, "Wideband Fibre–Optic Delay Network for Phased Array Antenna Steering," Electronics Letters, 25, 1456 (1989). No Month.

W. Ng, A. A. Walston, G. L. Tangonan, J. J. Lee, I. L. Newberg, and N. Bernstein, "The First Demonstration of an Optically Steered Microwave Phased Array Antenna Using True–Time–Delay," Journal of Lightwave Technology, 9, 1124 (1991). No Month.

E. Ackerman, S. Wanuga, D. Kasemset, W. Minford, N. Thorsten, and J. Watson, "Integrated 6–bit Photonic True–Time–Delay Unit for Lightweight 3–6 GHz Radar Beamformer," IEEE MTT–S Microwave Symposium Digest, 681 (1992). No Month.

C. T. Sullivan, S. D. Mukherjee, M. K. Hibbs–Brenner, A. Gopinath, E. Kalweit, T. Marta, W. Goldberg, and R. Walterson, "Switched Time Delay Elements Based on AlGaAs/GaAs Optical Waveguide Technology at 1.32 μm for Optically Controlled Phased Array Antennas," Proceedings of the SPIE, 1703, 264 (1992). No Month.

M. Wickham, L. Dozal, L. Lembo, and J. Brock, "A Fiber–Optic Bragg Grating True–Time Delay Generator for Broadband RF Applications," Proceedings of the SPIE, 2560, 148 (Feb. 1995).

L. Xu, R. Taylor, and S.R. Forrest, "True Time–Delay Phased–Array Antenna Feed System Based on Optical Heterodyne Techniques," IEEE Photonics Technology Letters, 8, 160 (Jan. 1996).

E. N. Toughlian and H. Zmuda, "A Photonic Variable RF Delay Line for Phased Array Antennas," Journal of Lightwave Technology, 8, 1824 (1990). No Month.

J. H. Hong and I. McMichael, "Novel Optical Technique for Phased–Array Processing," Optical Engineering, 30, 1976 (1991). No Month.

L. H. Gesell and T. M. Turpin, "True Time Delay Beam Forming Using Acousto–optics," Proceedings of the SPIE, 1703, 592 (1992). No Month.

N. A. Riza, "High Speed Two Dimensional Phased Array Antenna Scanning Using Acousto–Optics," Proceedings of the SPIE, 1703, 460 (1992). No Month.

(List continued on next page.)

Primary Examiner—Akm E. Ullah
Attorney, Agent, or Firm—Jacob N. Erlich

[57] ABSTRACT

An optical time shifter and routing system having high efficiency switched gratings to form optical time delay and routing networks. This system also includes a unique passive noise suppression device that can be used in multiple channel optical systems such as time shifters and routers to increase channel isolation and reduce crosstalk. The latter noise suppression devices are applicable broadly to the free-space time shifters as well as to other time shifters.

35 Claims, 16 Drawing Sheets

OTHER PUBLICATIONS

E. Spitz, D. Dolfi, and J-P. Huignard, "Microwave Beam Forming by Optical Delay Switching," Proceedings of the SPIE, 1807, 422 (1992). No Month.

E. N. Toughlian and H. Zmuda, "Variable Time–Delay System for Broadband Phased Array and Other Transversal Filtering Applications," Optical Engineering, 32, 613 (1993). No Month.

W. D. Jemison and P. R. Herczfeld, "Acoustooptically Controlled True Time Delays," IEEE Microwave and Guided Wave Letters, 3, 72 (1993). No Month.

N. A. Riza, "Polarization–Based Fiber–Optic Delay Lines," Proceedings of the SPIE, 2560, 120 (Feb. 1995).

D. Dolfi, , "Photonics for Phased Array Radars," Proceedings of the SPIE, 2560, 158 (Feb. 1995).

R. T. Ingwall and T. Adams, "Hologram:Liquid Crystal Composites," Proceedings of the SPIE 1555, 279–290 (1991). No Month.

Y–T Huang, "Polarization Selective Volume Holograms," Applied Optics, 33, 2115 (1994). No Month.

R. L. Sutherland, L. V. Natarajan, V. P. Tondiglia, T. J. Bunning, and W. W. Adams, "Switchable Holograms in New Photopolymer–Liquid Crystal Composite Materials," Proceedings of the SPIE, 2404, 132 (Mar. 1995).

Phased Array Antenna

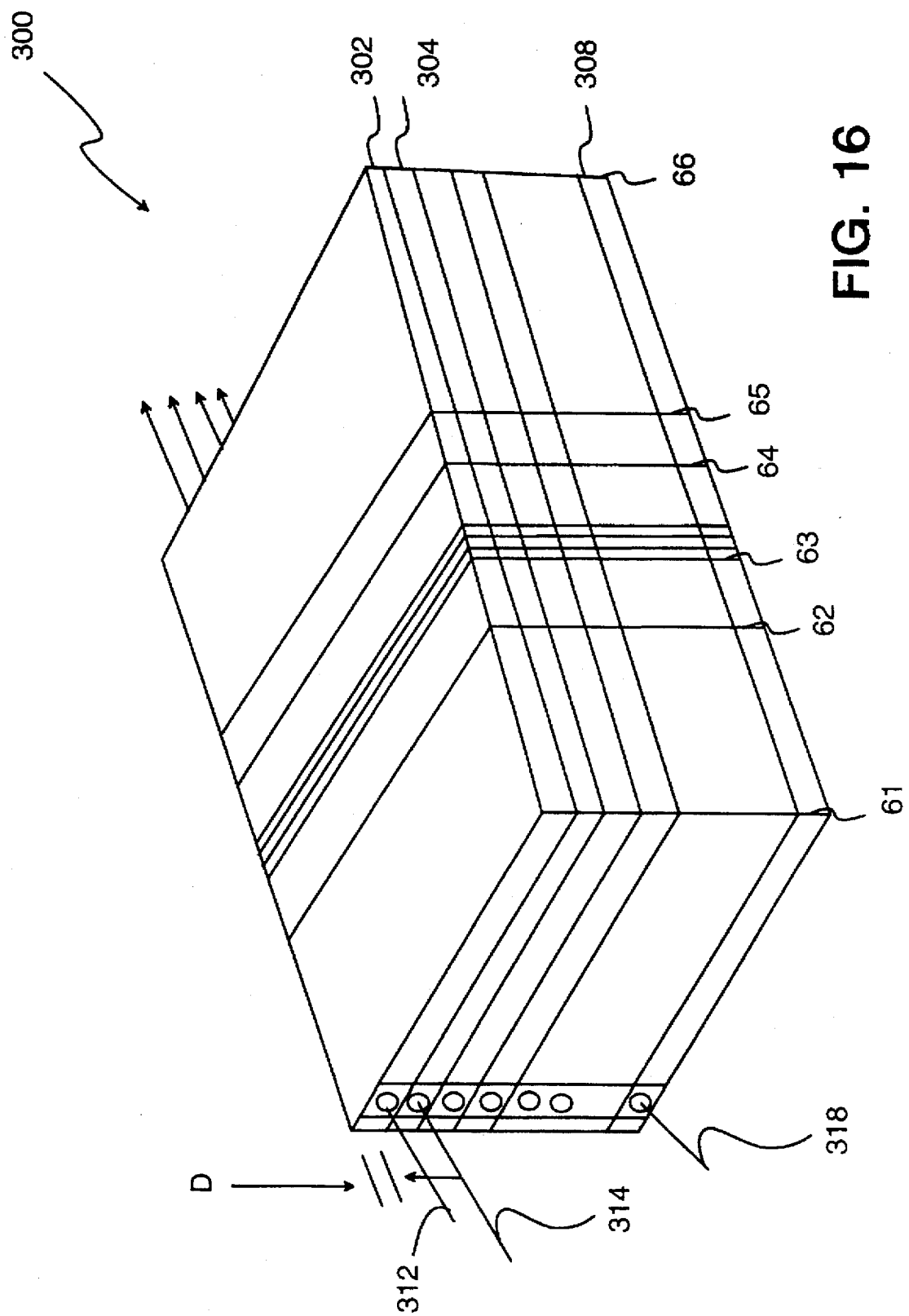

OPTICAL TIME SHIFTER AND ROUTING SYSTEM

STATEMENT OF GOVERNMENT INTEREST

This invention was made with Government support under Contract Nos. F30602-94-C-0151 and F30602-95-C-0238 awarded by the U.S. Air Force. The Government has certain rights in the invention.

FIELD OF THE INVENTION

The present invention relates generally to time delay systems, and, more particularly, to optical time shifter and routing systems which incorporate the use of diffractive optics and noise suppressors.

BACKGROUND OF THE INVENTION

With the advent of substanial new uses for electro/optic systems, there exists a greater need to effectively control the passage of electro-optic signals, both in their direction and time. This is especially true in phased array systems, although, it should be realized that this is just one of numerous electro-optic systems which require the use of an optical time shifting and routing mechanism.

Phased array systems are generally made up of arrays of many relatively isotropic radiators or emitters, spaced for example by half their radiating wavelength, that are each driven coherently but with a relative phase (or time) shift among individual elements or among subarrays of elements. Controlling this phase shift across the array of radiators permits the array to form a beam that is strongly peaked in the far-field. Using this well established technique, the direction of the beam can be steered electronically (much faster than is possible mechanically) by controlling the phase shifts. Further, the angular width of the beam decreases as the lateral extent of the array increases—driving the need for extensive arrays (e.g., in excess of one hundred wavelengths lateral extent) and thus for large numbers of elements. Even with subarraying techniques in which subsets of radiators are ganged to a common shifter so as to reduce the number of phase shifters required, the requirement for rapidly introducing phase or time delays into many parallel microwave channels forms a major technological challenge. It would therefore be highly desirable to provide digital time or phase shifting of signals for each emitter in a fast, accurate, compact, lightweight, inexpensive system while introducing minimal insertion losses and negligible spurious noise signals from scatter, reflections, and imperfect switch purity.

There are many practical barriers to implementing time delay networks directly in the microwave bands. These include difficulties such as: the power splitters used in such networks are large; the cables or waveguides used at microwave frequencies are bulky; the networks tend to be lossy; and dispersion of these delay lines makes the use of multiple bands difficult. Photonic technologies can be applied to this problem, for example, by converting the microwave signals to modulation on optical carriers, introducing the required delays optically, and then converting back into the microwave regime. This type of translation scheme permits the use of optical devices and techniques in phase shifting that are superior to those operating directly in the microwave regime.

For example, optical time delay networks can potentially be light weight, compact, and insensitive to electromagnetic crosstalk and interference. They can provide very long delays when required. Further, the dispersion effects are greatly reduced and multiple microwave bands can use the same delay network. Still, the advantages of using optical phase or time shifting must outweigh the overhead associated with converting to and from the optical regime.

Another technological challenge associated with driving phased array antennas arises in systems utilizing large bandwidth signals. When beam forming is accomplished by introducing phase delays (rather than time delays), large bandwidths cause the direction of the beam to detune from its desired direction. Since very large bandwidths are required for communication and identification of targets and tracking (as opposed to many searching tasks), true time delay beam forming networks are also important in high performance phased array systems.

In addition to the requirement for true time delay in beam forming for future phased array radar systems that utilize large bandwidth signals, it has been shown that time delay networks are needed with 1) low insertion loss (to reduce amplifier gain and resulting nonlinearities with strong signals); 2) low crosstalk among delay channels (to reduce amplitude and phase distortions in the resulting signal); and 3) low spurious signal generation (to reduce the formation of unwanted lobes in the array pattern). These additional requirements augment the technological challenge in future beam forming networks.

Recently there has been much attention to the application of photonic time delay networks for addressing the phased array beam forming problem. There are many openings for the application of optical approaches in radar systems, and the concept of optical beam forming with time delay networks has been physically demonstrated in W. Ng, A. A. Walston, G. L. Tangonan, J. J. Lee, I. L. Newberg, and N. Bernstein, "The First Demonstration of an Optically Steered Microwave Phased Array Antenna Using True-Time-Delay," Journal of Lightwave Technology, 9, 1124 (1991). The bulk of the optical approaches, however, have been directed at switching and delaying the optical carrier using guided waves such as in optical fibers or planar waveguides. Many of these techniques use combinations of integrated optical switches and guided wave delay lines.

Other approaches for optically introducing time or phase shifts which have difficiencies associated therewith include the use of heterodyning and coherent techniques and the use of segmented mirror spatial light modulators and polarization routing through prisms in free space.

It is quite apparent there is still much room for advancement in these prior approaches, particularly with respect to losses, complexity, crosstalk, switch isolation, compactness and multiple reflection suppression.

It is therefore an object of this invention to provide an optical time shifter and routing system which incorporates therein a free-space switching technique.

It is a further object of this invention provide an optical time shifter and routing system which has superior switch isolation, multiple reflection and crosstalk suppression; less complexity and lower insertion loss; and less stringent wavelength tolerances than time shifting systems of the past.

It is another object of this invention provide an optical time shifter and routing system which is extremely compact.

It is still another object of this invention provide an optical time shifter and routing system which utilizes a series of switchable gratings therein.

It is still a further object of this invention provide an optical time shifter and routing system which incorporates saturable absorber noise suppressors therein.

SUMMARY OF THE INVENTION

The present invention overcomes problems associated with switch isolation, noise and crosstalk suppression, insertion loss, spurious reflections, wavelength tolerance, and compactness that are present in other optical time shifter devices. The present invention includes devices that use high efficiency switched gratings to form optical time delay and routing networks. Also subject of this invention is a unique passive noise suppression device that can be used in multiple channel optical systems such as time shifters and routers to increase channel isolation and reduce crosstalk. The latter noise suppression devices are applicable broadly to the free-space time shifters as well as to other time shifters and routers, for example, those using guided waves.

For a better understanding of the present invention, together with other and further objects, reference is made to the following description taken in conjunction with the accompanying drawings, and its scope will be pointed out in the appended claims.

BRIEF DESCRIPTION OF THE DRAWINGS

FIG. 16 is a schematic representation of a further embodiment of the optical time shifter and routing system of this invention in which a plurality of such devices are stacked using micro-optical techniques into a compact form enabling the independent time shifting of a plurality of input carrier beams.

DETAILED DESCRIPTION OF THE PREFERRED EMBODIMENTS

The present invention provides a digital free space optical time delay (shifter) and routing network utilizing a switchable grating based approach together with novel noise suppression techniques. The incorporation of free space switching in the present invention has several distinct advantages over past time delay techniques. More specifically, these advantages include the potential for superior switch isolation, multiple reflection and crosstalk suppression, less complexity and lower insertion loss, and less stringent wavelength tolerances. Furthermore, the utilization of free space geometry enables the present invention to utilize saturable absorber noise suppressers within the system. This technique provides a very large gain and signal purity by suppressing crosstalk, scatter, and multiply-reflected (spurious) waves.

Figure 1:
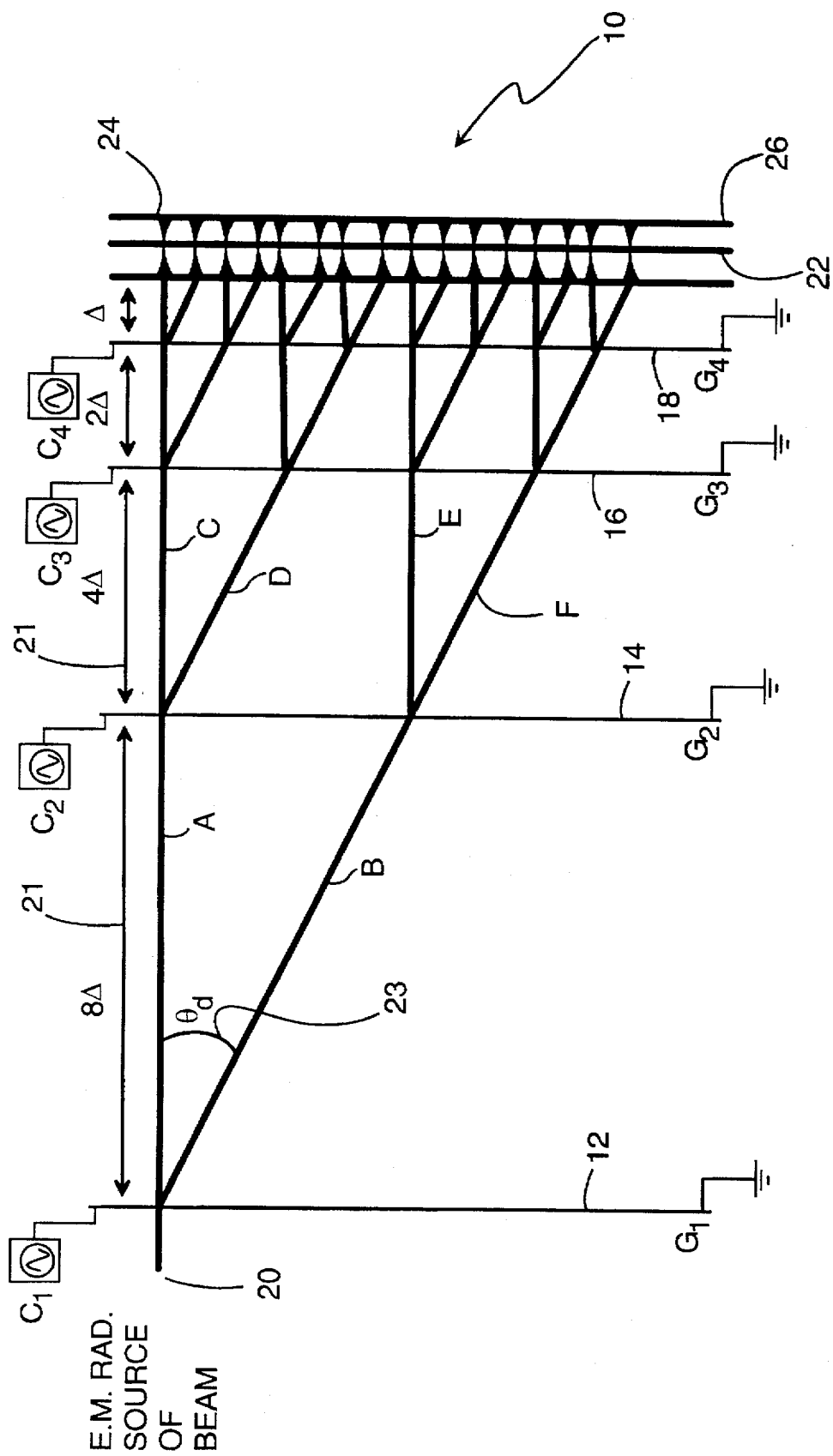
FIG. 1 is a schematic representation of the optical time shifter and routing system of this invention incorporating electrically switchable gratings therein.

Reference is now made to FIG. 1 of the drawings which illustrates the broad concept of the invention in schematic fashion, thereby presenting an overview of the digital optical time shifter and routing system of the present invention in one of numerous embodiments, the other embodiments being set forth below with respect to the remaining figures.

One embodiment of the optical time shifter and routing system 10 of this invention is illustrated in FIG. 1 of the drawings and depicts a plurality (four being illustrated therein as an example, not as a limitation on this invention) of switchable gratings 12, 14, 16, 18 which are controlled by any suitable control signals C1-C4 and shown in a cascading fashion. This embodiment enables a beam of electromagnetic radiation, preferably in the form of an optical input carrier 20 to follow 16 possible optical paths. All of these paths being configured in free-space, without external limitations, although it should be realized the system of this invention can be encompassed in a medium of dielectric constant other than unity. In other words, glass or other transparent slabs may be used to seperate the planes of switched gratings to provide for a monolithic and stable device that is not easily misaligned. Thus, free space in the context of this invention describes the use of freely propagating electromagnetic waves in comparison to guided wave systems in which the optical carriers are confined to waveguides which are typically of fiber or planar form.

In this embodiment of the present invention, each optical path can add a preselected constant increment in time delay to a transmitted signal. By selecting one of the 16 combinations of "on or off" states in the gratings 12, 14, 16, and 18, an input optical carrier signal 20 emanating from any suitable source of electromagnetic radiation (not shown) is diffracted to follow one of the series of paths as shown in FIG. 1. For example, the beam of electromagnetic radiation or optical carrier 20 follows either path A or B after passing through grating 12 and thereafter after passing through grating 14 follows preselected paths C, D, E, or F. Thereafter further different optical paths may be followed as illustrated in FIG. 1.

More specifically, the time delays are strong functions of parameters including stage separation 21 and diffraction angle 23. The gratings, which may take the form of holographic elements, have a distinct tradeoff relating to the Bragg regime of their operation. Parameters such as thickness and spatial period must be balanced to assure high diffraction efficiency but also to retain maximal angular and spectral bandwidth tolerances. Finally, the use of microoptics enables very compact time shifters, and requires the balancing of channel density and diffractive crosstalk effects as will be pointed out hereinbelow.

Two major free parameters in the time shifter configurations are the minimum spacing of the stages and the bias diffraction angle 23. As the number of stages are increased, their separation 21 increases in multiples so it is usually advantageous to keep spacing small, thus keeping the overall shifter compact. Values of stage separation 21 in the range from 1 mm to 10 mm are small and at the same time easy to engineer. A six-bit time shifter as shown in FIG. 1 would only need be on the order of 3 cm in length. The range in digitally selectable minimum time increments available in such a shifter is a strong function of bias diffraction angle. The more stages or larger the diffraction angle, the longer is the maximum delay that is obtainable.

An advantage of working in the free-space domain in the present invention is the ability to trade off between thin (Raman-Nath) diffraction regimes and thick (Bragg) diffraction regimes. In the thin limit, diffraction efficiencies are low but there are practically no wavelength or angle restrictions on the diffraction efficiency. At the other extreme, Bragg diffraction is characterized by extremely high diffraction efficiency but is restricted to narrow angular and spectral bands. The trading-off between the "thin" (Raman-Nath) and "thick" (Bragg) diffraction regimes removes a difficulty with many laser sources since moderate frequency drifts and mode hops (e.g., tens of nm) will not cause a large change in diffraction or coupling efficiency. This reduces a dispersion problem faced in many guided wave approaches.

The time shifting and routing systems of this invention generally utilize volume phase diffraction gratings that permit switching of the incident energy between two or more of the diffracted orders. The primary mechanisms considered which obtain this diffracted-order switching are electrical switching, optical switching, and polarization switching of the gratings, all of which are discussed with specific embodiments of the invention.

As shown in FIG. 1, the diffractive optical gratings are switched electrically to redirect the beams. An advantage of electrical switching is that the gratings can be small and are potentially scalable to accommodate large arrays. The optical, electrical, polarization and other switching mechanisms are all potentially useful for the optical time shifter and routing system of the present invention, while with current technology, the polarization-based mechanisms appear to be particularly useful.

Recently it has been demonstrated in the literature that high efficiency volume diffraction gratings which are recorded in permeable media, such as the DMP-128 photopolymer manufactured by Polaroid Corporation, Cambridge, Mass. can be made to be rapidly switchable between high and low diffraction efficiency states under electric control by imbibing the structure with nematic liquid crystals. In this technique, the crystals are rotated by the applied electric field and their refractive index switches between ordinary and extraordinary values. By choosing the materials so that one of these switchable values of refractive index matches that of the phase modulation in the grating, the grating modulation is effectively switched "off-and-on" as the liquid crystal "fill" material index matches and mis-matches the modulation, respectively.

Most of the optical time shifter and routing systems described herein can utilize electrically switched gratings. In this approach the volume phase diffraction grating, which is typically on the order of 10 microns thick, is bounded by transparent conducting electrodes.

Referring once again to FIG. 1, it should be further understood that although four such gratings are illustrated in the figure, the number of grating can vary in accordance with the utilization of this invention. For example, with the diffraction efficiency of all four gratings off, the shortest, straight through path (that is, following along optical path A, C, etc.) is selected. If the first grating 12 is "on", and all others "off," the longest path is selected following optical path B, F, etc. Consequently, by a combination of "on", "off" signals applied to the gratings, it is possible in free space to not only route the optical signal to a desired output area, but also to do so with a predetermined time delay.

Continuing with a description of the embodiment of the invention shown in FIG. 1, after passing through the last grating 18, the chosen optical path can be directed by means of any suitable fixed optical redirection component 22, such as a diffractive microlens array which is utilized to make the direction of the output beams from the many channels uniform. For example, as shown in FIG. 1, the off-axis holographic lenses switch off-axis beams on-axis prior to impinging upon a suitable detector 24. In this latter example a focusing effect (optical power) is introduced into the off-axis elements to interface to the saturable absorber crosstalk suppressor. Alternatively, an additional switched grating may be used in place of the fixed optical redirection component 22 since the various channels are either directed in the proper ion axisi direction, or in a discrete off-axis direction. Accordingly, the switched grating is turned off if the selected channel is one exiting the preceding grating cascade in the desired direction, and is turned on if the selected channel is off axis, thus diffracting the beam in the desired direction.

Another important aspect of the present invention is the incorporation therein of a saturable absorber nois suppressor 26 interposed between the optical redirection component or difractive microlens array 22 and detector 24. This arrangement with the use of high efficiency volume diffraction gratings permits low insertion loss, and by focusing each channel or optical path through a saturable absorber or other noise suppresser stage 26 spurious, scattered, and ghost signals can be greatly attenuated with little loss of power in the selected channel. The details of this suppressor stage or saturable absorber 26 will be explained in greater detailed hereinbelow.

The saturable absorber noise suppressor 26 utilized in optical time shifter and routing systems of this invention may use any saturable absorber material, for example, nonlinear absorption in atomic, molecular or tailored quantum-well saturable absorbers to heavily attenuate signals in non-selected channels while imposing lower or negligible loss on the signal in the selected channel. Each of the selectable optical paths is focused on a separate location of a saturable absorber film. The nonlinear absorber is optimized so that the path that is selected has enough intensity to saturate the absorber, and is transmitted with little effect. However scatter, imperfect diffraction efficiency and switching contrast, and other effects combine inevitably resulting in noise signals that propagate in the nonselected channels which have the improper delay or position. These signals can be the cause of many deleterious effects in the overall system. While it is impossible to perfectly eliminate all noise signals, the present invention is capable of keeping them at a relatively low signal level in comparison with the selected channel. When these low intensity beams are incident on the absorber 26, they are not capable of saturating the absorption, and are much more strongly attenuated than the beam in the selected channel.

Figure 2:
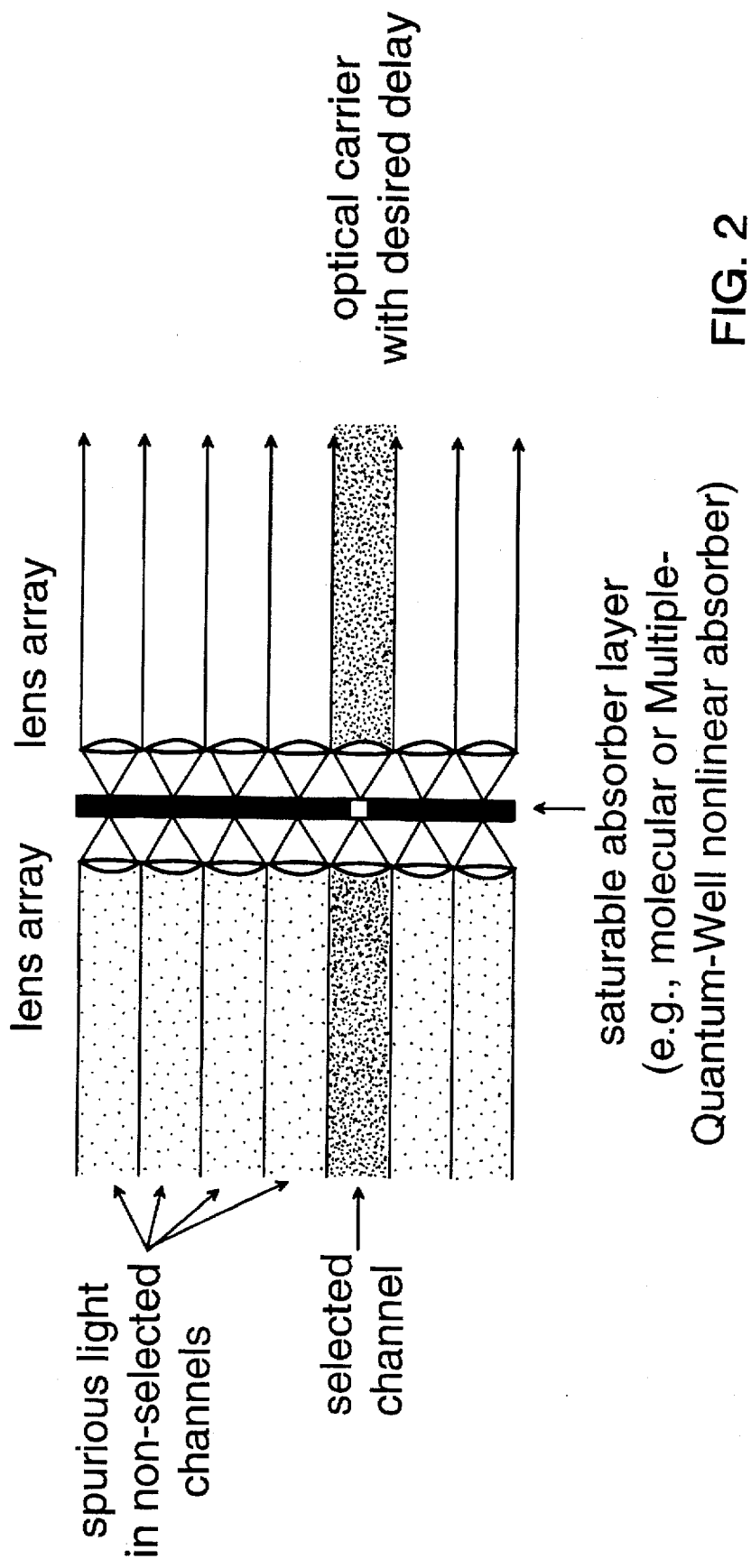
FIG. 2 is a schematic representation of a typical saturable absorber utilized to suppress noise in the optical time shifter and routing system of this invention.

Reference is made to FIG. 2 for a schematic illustration of the operation of absorber 26. The effectiveness of the absorber involves the selection of a nonlinear material with the proper (optimized) saturation intensity and time constant. The required intensity varies with the time constant of the nonlinear material, and the time constant must be chosen to be fast enough to not limit switching time, and yet slow enough so as not to distort the modulation on the optical carrier.

Another novel feature of the optical time shifter configurations of this invention is their use of a device with thin saturable absorber films to absorb any weak signals that leak through non-selected channels due to imperfect diffraction efficiency, scatter, etc.—while transmitting the signal in the selected path with only very small attenuation. The basic concept is shown in FIG. 2, and according to this technique, the optical signals in each of the selectable delay paths are focused onto a thin film of saturable absorber before the optical channels are recombined or detected (reconverted to microwave channels). The saturable absorber noise suppressor (SANS) is a scatter, spurious beam, and crosstalk suppression device that was developed for use in the time shifters described here, but which are useful for enhancing signal-to-noise in a broad range of multichannel optical systems.

More specifically, a saturable absorber responding to incident intensity I has a transmittance given by:

$$T = e^{-\alpha(I)(L)},$$

where L is the thickness of the saturable absorber and the intensity dependent absorption is given by:

$$\alpha(I) = \frac{\alpha_0}{1 + I/I_{sat}}.$$

The saturation intensity is $I_{sat} = h\nu/\sigma\tau$, where $\alpha_o$ is the low intensity absorption coefficient, and $\sigma$ is the absorption cross section of the absorber.

For a typical saturable dye which is assumed, for example, to have a response time t of a microsecond, the saturation intensity is of the order $10^3$ W/cm$^2$. If the beam is focused to a spot size of 5 microns, the power needed to saturate the absorber is on the order of a milliwatt. Thus, such a film of saturable absorber with a frequency response on the order of a megahertz can be used to significantly attenuate the low intensity signals that arise from scatter or that leak through non selected paths—and yet transmit the desired signal, even at power levels as low as milliwatts, with little attenuation. Alternatively higher powers can be used in the switched grating optical time shifter of this invention and the need for focusing can be eliminated (thus reducing complexity). By choosing the saturable absorber time constant to be slower than the modulation frequency on the optical carrier, signal degradation effects resulting from the saturable absorber will be avoided.

A key tradeoff should be possible wherein a proper absorber time constant can be matched with a useful saturation intensity. The time constant must be slow enough to pass desired modulations on the optical carrier without distortion, and fast enough so as not to limit beam steering (channel selection) time. For example, if the absorber time constant is on the order of the inverse of the RF modulation frequency, the absorber could recover in a period when the modulated carrier was relatively low in intensity, and would then absorb the leading edge of the following higher intensity signal while it became re-saturated. At the other end of the tradeoff, if the absorber time constant is slow compared with the electronic or optical switching time, an additional time delay will be required once the new channel is selected while the absorber saturates—thus limiting the response time of the time shifter. However, keeping the saturation intensity as low as possible is desirable since the lower saturation intensities result in more practical required power levels, such as 1 mW per carrier and below.

Saturable absorbers have the advantages of being relatively inexpensive, available in a broad range of saturation intensity/time constants, and are often easily incorporated into convenient solid state hosts such as acetate sheets. Any absorbing material or system that saturates with intensity can be applied in this device. One type of s particular interest with the present invention is multiple quantum well (MQW) saturable absorbers. Dyes, ions, and complexes also be applied. The saturation intensity typically decreases as the time constant of the saturable absorber increases, in what is a well defined trade-off for many saturable absorber systems. It appears possible to deviate from this usual trade-off through suitably designed multiple quantum well absorbers that can provide faster time responses at a given saturation intensity than can most other saturable absorber systems. The improvement in required intensity for a given time constant shown by typical MQW saturable absorbers is on the order of three orders of magnitude.

Saturable absorber noise suppressors of the present invention do not rely on the absorbers being localized in thin films. For example, a saturable absorber noise suppressor can be fabricated in a waveguide system by doping a small concentration of the absorber in either the guide or clad region, or both.

In summary, the saturable absorber noise suppressor 26 makes use of a nonlinear, intensity dependent absorption to attenuate spurious signals in non-selected delay channels while imposing smaller or negligible absorption on the optical carrier in the selected delay channel.

Figure 4:
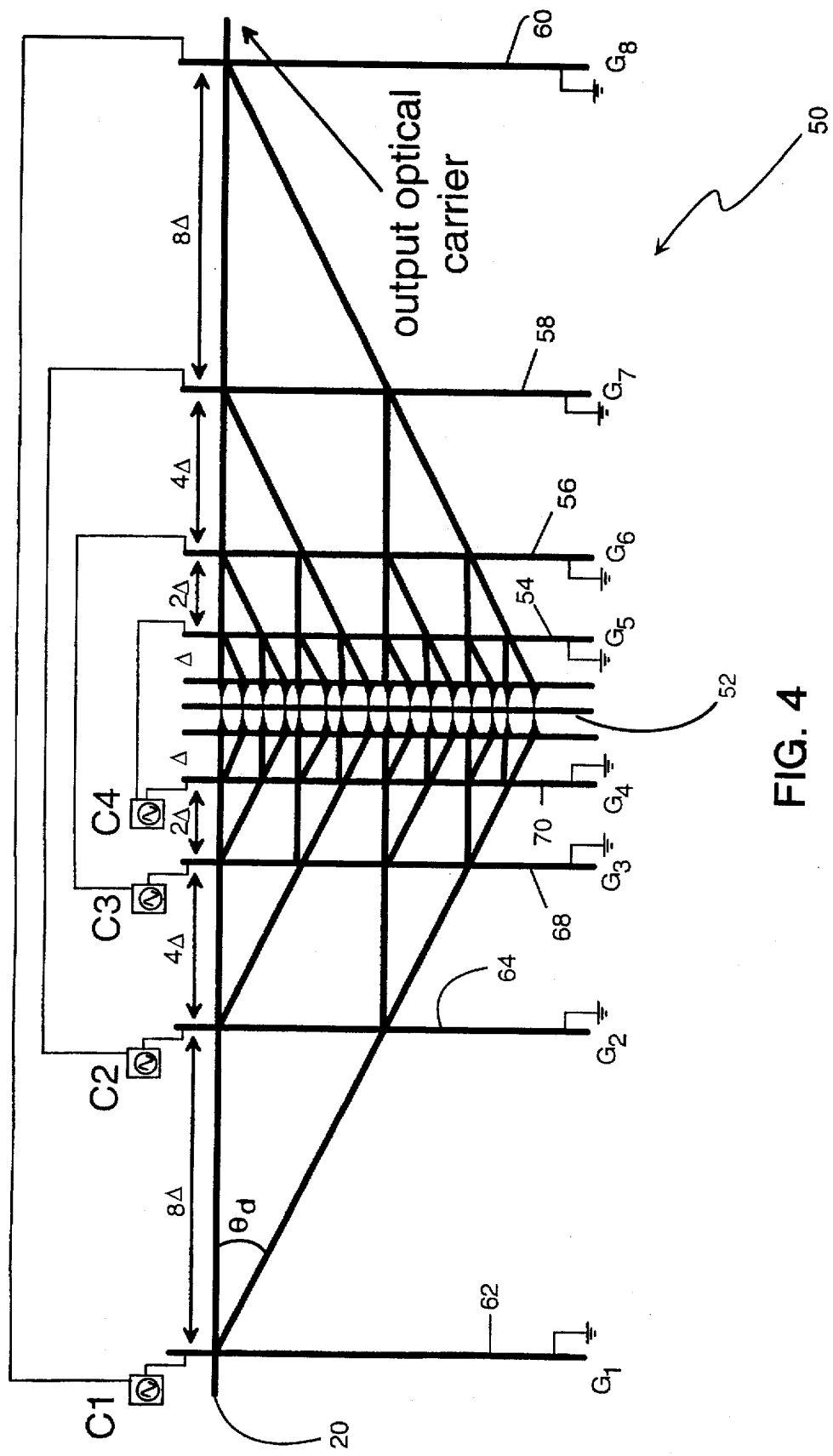
FIG. 4 is a schematic representation of another embodiment of the optical time shifter and routing system of this invention in which the output exits from a single location.

Once again, referring to FIG. 1 of the drawings, the delayed carrier signal 20 after passing through absorber 26 is then detected at detector 24, or in a useful extension of this present configuration, a symmetric mirror image of this configuration in order to exit the delayed paths at a single location as illustrated in FIG. 4 of the drawings, for example. The wide latitude in choice of grating spacing diffraction angle, and other parameters gives fine control of digital time increments from the femtosecond regime through hundreds of picoseconds and nanoseconds with latger configurations.

Total delays of $2^n$ times these increments are obtainable with the configuration shown in FIG. 1 of the drawings.

Utilizing n cascaded gratings as shown in FIG. 1, gives digital selection among $2^n$ delays which range from 0 to 2n-1 times the incremental delay time. Therefore the more gratings or stages, or the larger the diffraction angle 23, the longer the maximum delay obtainable.

Figure 3:
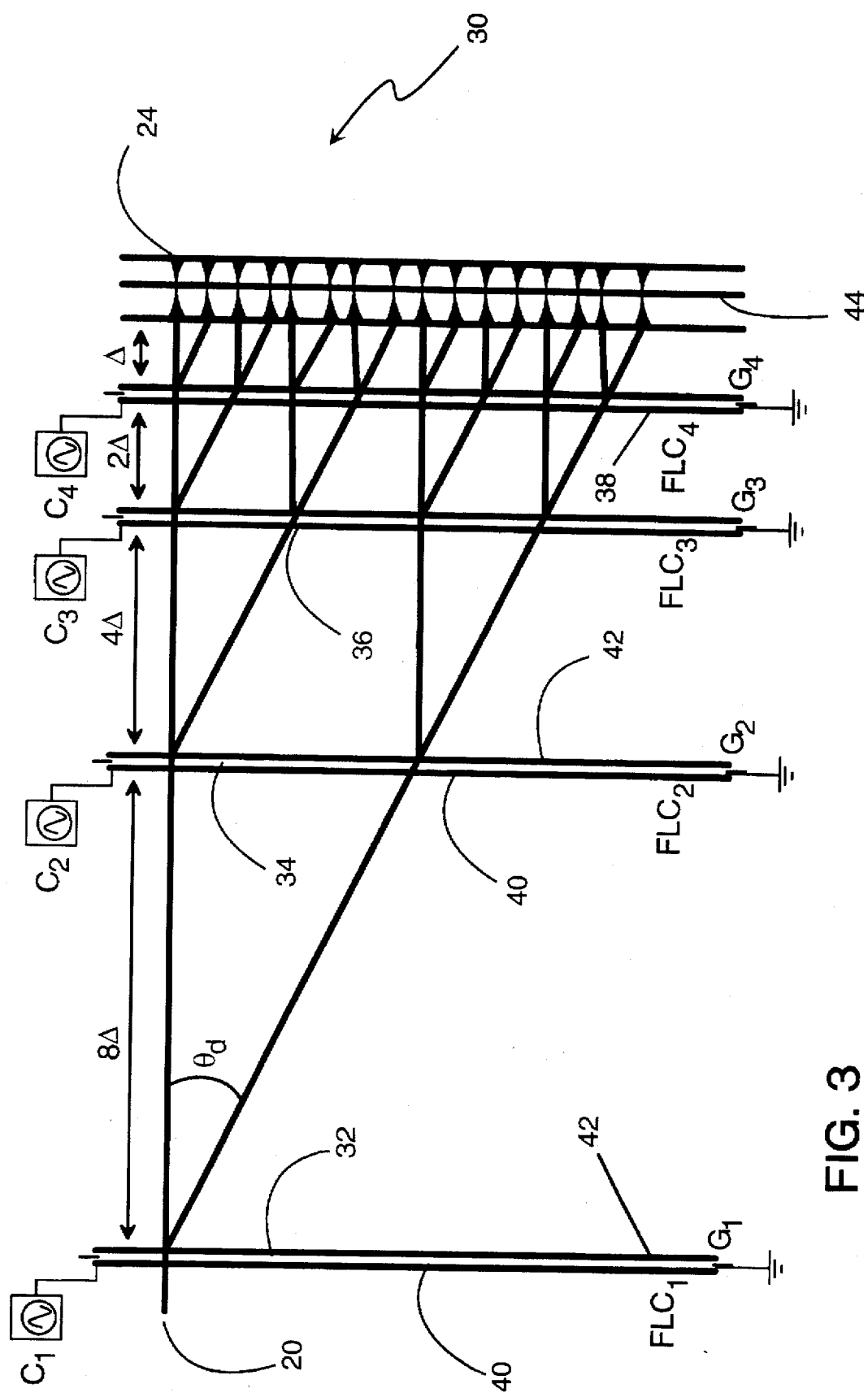
FIG. 3 is a schematic representation of a further embodiment of the optical time shifter and routing system of this invention incorporating polarization switchable gratings therein.

Reference is now made to FIG. 3 of the drawings, which utilizes a polarization switched grating technique. The polarization switching approach as illustrated in FIG. 3 of the drawings is incorporated within an optical time shifter and routing system 30 similar to the configuration shown in FIG. 1 but incorporates cascades of polarization rotating switches 32, 34, 36 and 38. These devices can be made up of a ferroelectric liquid crystal polarization switch 40 in combination with a polarization sensitive holographic grating 42. With the embodiment of the invention shown in FIG. 3 of the drawings, the switching is still electrical, but a control signal is used to switch the diffracted order containing the optical carrier by either leaving the current state of polarization intact or rotating it by 90 degrees.

A subtle distinction is made in mapping the control signals for a given delay channel selection depending on whether direct electrical or polarization switching is used. In the former case, each grating is a diffractive or transmissive state depending on the control signal. Thus the control sequence 1-0-0-0 corresponds to the lower most path which is diffracted at the first grating and transmitted through all the subsequent gratings in the zero-order. However, assuming the incident carrier is in the non-diffractive polarization state and the polarization switching mechanism, the same sequence could represent the first rotator being active and the others being off, in which case the optical carrier would be diffracted by the first and all subsequent gratings, thus taking the sixth delay channel from the bottom of the figure.

As with a configuration shown in FIG. 1 of the drawings a similar saturable absorber noise suppressor 44 is utilized to suppress noise, crosstalk, reflections, and spurious signals resulting from imperfect switching purity. Also, the polarization switched grating technique can be utilized with other embodiments of the present invention.

Reference is now made to the embodiment of FIG. 4 of the drawings in which the free space digital optical switched grating time shifter and routing system of the present invention takes on a symmetric configuration by reflecting it and unfolding it about the saturable absorber noise surpresser 52. The time shifter and routing system 50 as shown in FIG. 4 has the practical advantage that the optical carrier 20 enters and exits at a single spatial location, regardless of the selected amount of delay. With the embodiment illustrated in FIG. 4 of the drawings, a set of recombination gratings 54, 56, 58 and 60 are utilized in combination with the gratings 62, 64, 68, and 70 as previously discussed with respect to FIG. 1 of the drawings. This recombination set of gratings may be controlled by the same signals as the initial set of gratings and so only n control signals are required for the n bit selection in delays. Therefore only a single detector is required.

At first glance, it appears that the saturable absorber noise suppressor 52 located in the center of the configuration may be effective only for suppressing noise and spurious beams generated in the front half of the system. However, this location is effective for eliminating the deleterious beams from the second half of the system too. For example if channel 1-0-0-0 is selected, spurious signals propagating into the other 15 channels, if not blocked in the center, could follow many paths in the combination stage of the system to arrive superimposed on the optical carrier with the selected delay. All fifteen of these spurious paths are, however, attenuated by the saturable absorber noise suppressor 52 in the center of the system. On the recombination side, however, the one selected channel is free to couple to other diffracted orders through imperfect switch isolation, for example. But since there is a unique path from any of the channels in the center to the one exit location, any such spurious beams will not be superimposed on the optical carrier with selected delay.

Figure 5:
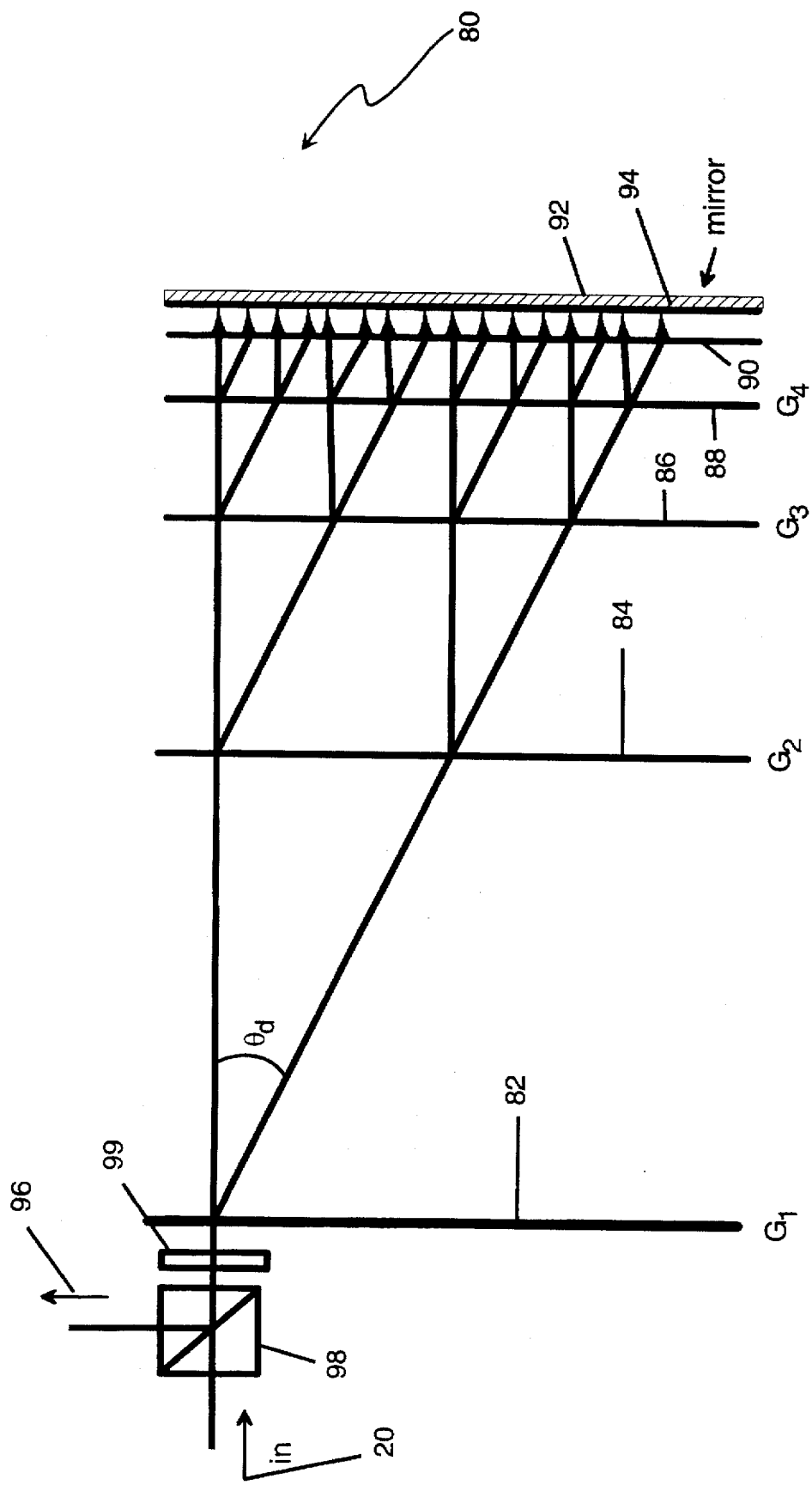
FIG. 5 is a schematic representation of an embodiment of the optical time shifter and routing system of this invention in which the output exits from a single location through the use of a double pass configuration.

A double pass configured time shifter and routing system 80 is illustrated in FIG. 5 of the drawings. This double pass configuration is extremely compact and has the option to double pass the optical or electromagnetic beam through a grating cascade rather then unfolding it about the saturable absorber noise suppressor as shown in FIG. 4.

This embodiment of the invention is very useful in certain circumstances. For example, the system can cost nearly half as much since half the hardware is required. The added compactness is also a distinct advantage. The time shifter and routing system 80 incorporates therein a plurality of gratings 82, 84, 86 and 88 in combination with a difractive microlens array 90. The lens array 90 images the output on a reflective element 92, in the form of, for example, a mirrored surface. In this instance the saturable absorber 94 may be coated directly on the mirror 92, with the effect being of using a "black mirror" in the middle of the system which is nearly transparent only in the tiny "pinhole" that it is bleached by the high intensity of the carrier electromagnetic beam in the selected channel or path of operation. The double pass through the saturable absorber 94 in this embodiment of the invention gives further absorption to weak (spurious) beams while enhancing the bleaching of the absorber and location of the selected optical channel.

In order to differentiate between the incoming electromagnetic beam or input carrier 20 and the outgoing electromagnetic beam 96, any suitable beam splitter 98 is utilized in conjunction with a quarter-wave plate 99 at the input end of the system. This arrangement permits the output to travel in one direction while the input travels in another. As with all of the other configurations, the specific type of grating described hereinabove utilized with the present invention can vary within the scope of the present invention. For example, the polarization switched gratings may be utilized in all of the embodiments, if so desired.

Figure 6:
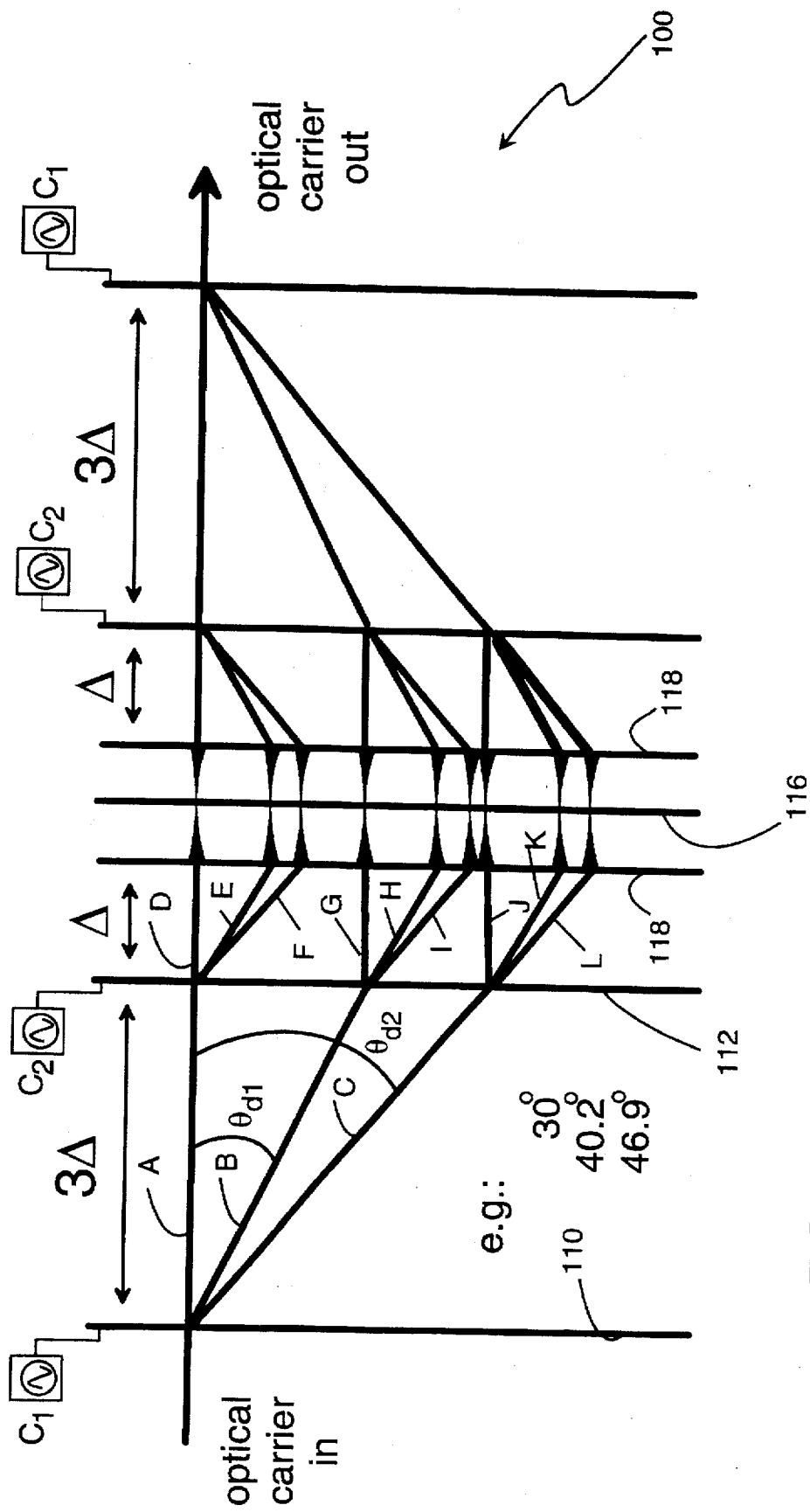
FIG. 6 is a schematic representation of a further embodiment of the optical time shifter and routing system of this invention in which the overall size of the system is substantially reduced.
Figure 7:
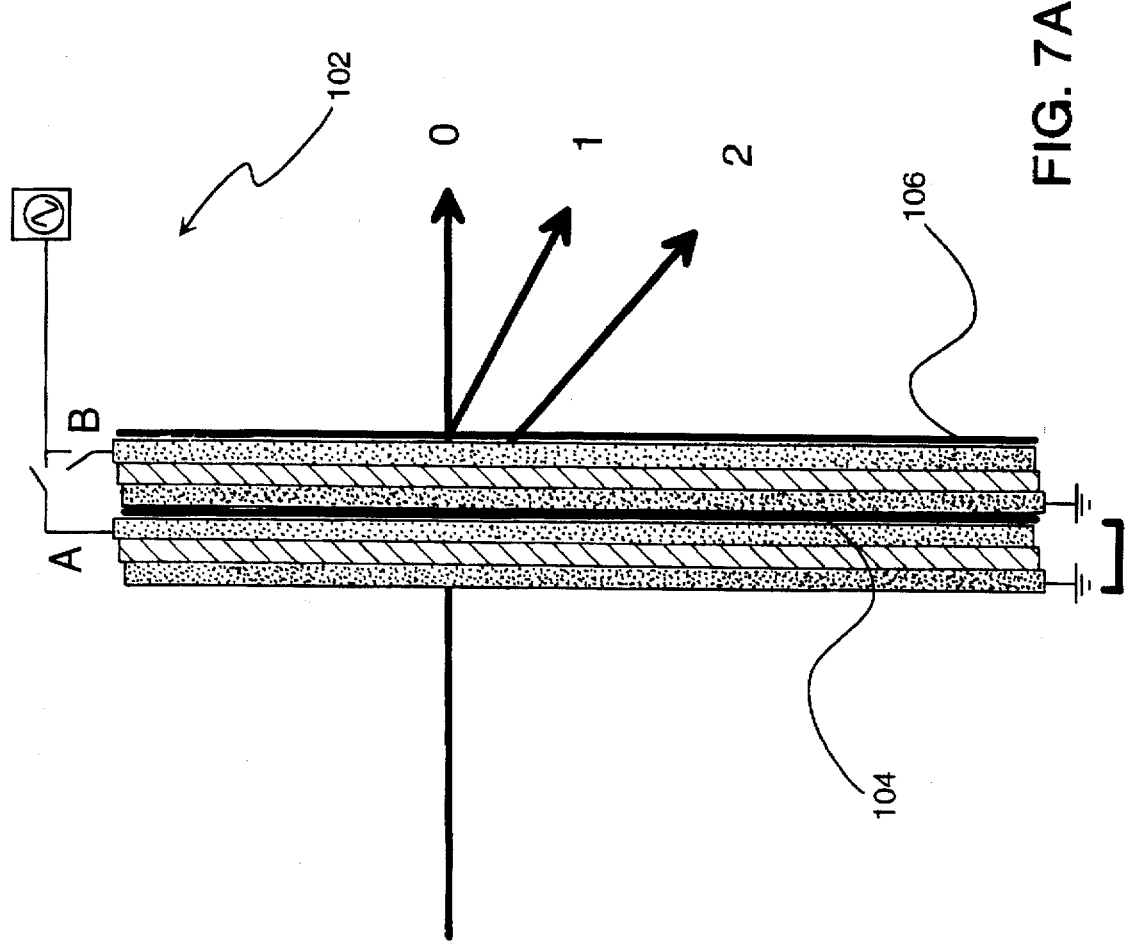
FIG. 7A is a schematic representation of the grating system utilized in the embodiment of this invention shown in FIG. 6.
FIG. 7B is a chart representative of the various states of the gating system of FIG. 7A.

Reference is now made to FIG. 6 of the drawings which schematically illustrates a further embodiment of the present invention in which the time shifter and routing system 100 incorporates therein a series of closely cascaded gratings which act in the tri-state. In other words, as shown in FIG. 7 of the drawings, the cascaded gratings or multi-state grating 102 incorporate therein a pair of gratings 104 and 106 which are independently switchable and can be fabricated with independent diffraction angles. Since the gratings typically operate in the Quasi-Bragg regime, if the first one is turned "on", the beam can be Bragg-mismatched through the second element, so the second control in this case is a "don't care". The ability to select from among multiple angles can greatly compact the shifter and routing system of the present invention.

Referring once again to FIG. 6 of the drawings, multi-state gratings 110 and 112, for example, are arranged in a similar fashion to the gratings as shown in FIG. 4 of the drawings. In such an arrangement, an input electromagnetic beam of electromagnetic radiation which is received by grating 110 can follow any one of three different paths, A, B, or C. And, thereafter can either be further divided into paths D, E, F, or G, H, I, or J, K or L as shown in FIG. 6. As with the embodiment of the shifter and routing system shown in FIG. 4 of the drawings, a saturable absorber noise suppressor 116 is utilized in conjunction with a pair of difractive microlens arrays 118 or other suitable redirection component such as discussed with FIG. 1. In this embodiment the optical carrier is output at a single location, similar to that shown in FIG. 4.

A motivation for use of this multi-state grating configuration within another embodiment of this invention is that simple higher diffracted orders of a single frequency grating cannot, in general, be used for this application and provide equally spaced delay increments. This is because higher grating orders add equal increments in the sine of the diffracted angle. Thus incremental deviation angles increase from order to order, which is the opposite of the decreasing increments needed to produce equal time increments. For example, if the first order is diffracted at 30 degrees, an incremental change of 10.2 degrees (to 40.2 degrees) would be useful for the configuration shown in FIG. 6 for equal delays. Similarly, the next properly spaced order would be increased by 6.7 degrees.

Figure 8:
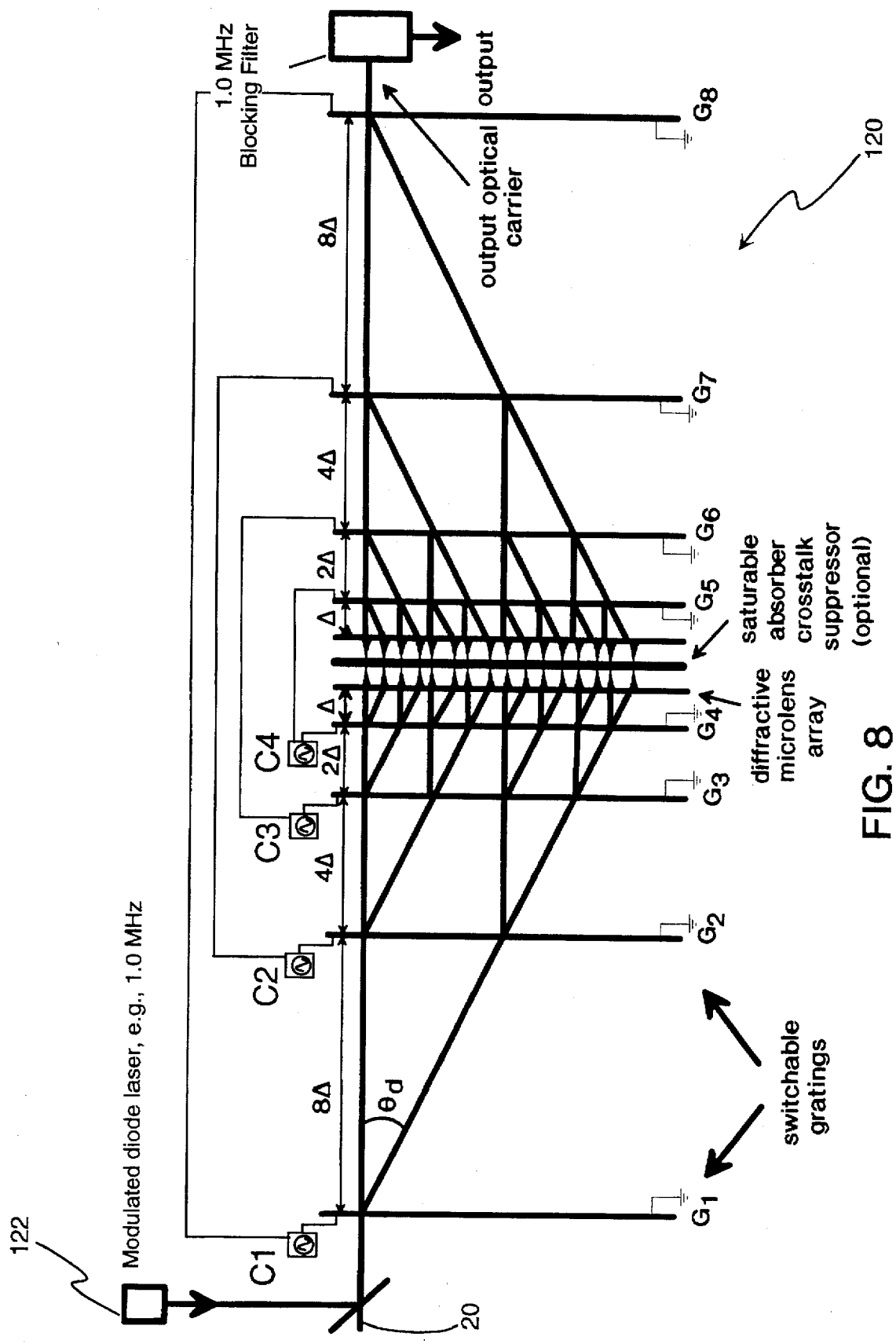
FIG. 8 is a schematic representation of a further embodiment of the optical time shifter and routing system of this invention in which a modulated signal is added to the optical carrier in order to allow the simultaneous transmissioin of high and low frequency signals through the noise suppression stage.

Reference is now made to FIG. 8 of the drawings which clearly schematic illustrates a simultaneous microwave and audio transmission time shifter and routing system 120.

There are two special cases where signal distortion may be encountered with the saturable absorber noise suppressor utilized within the present invention. The first occurs when very large amplitude modulation is imposed on the optical carrier, and a series of "low" bits or long low carrier intensity occurs. In such a case if the saturable absorber time constant is exceeded, the absorption will begin to rise and the following signal edge will be distorted as the leading intensity edge drives population into the higher level and the absorber is re-saturated. The second case where this problem might occur is if a low frequency (e.g., audio) modulation is imposed on top of the optical carrier. Again, if the modulation is large, recovery of the absorber can occur with subsequent signal distortion. An interesting solution to this problem is also recognized in the present invention with the introduction of an ancillary pulsed or CW beam to the incoming signal, as illustrated in FIG. 8 of the drawings. This added beam can keep the saturable absorber noise suppressor bleached for the selected channel or path, while not affecting the non-selected channels appreciably. For the CW case, the resulting bias can be subtracted; and in the modulated case the single modulation frequency can be filtered either optically or electronically from the desired time-shifted signal.

Figure 9:
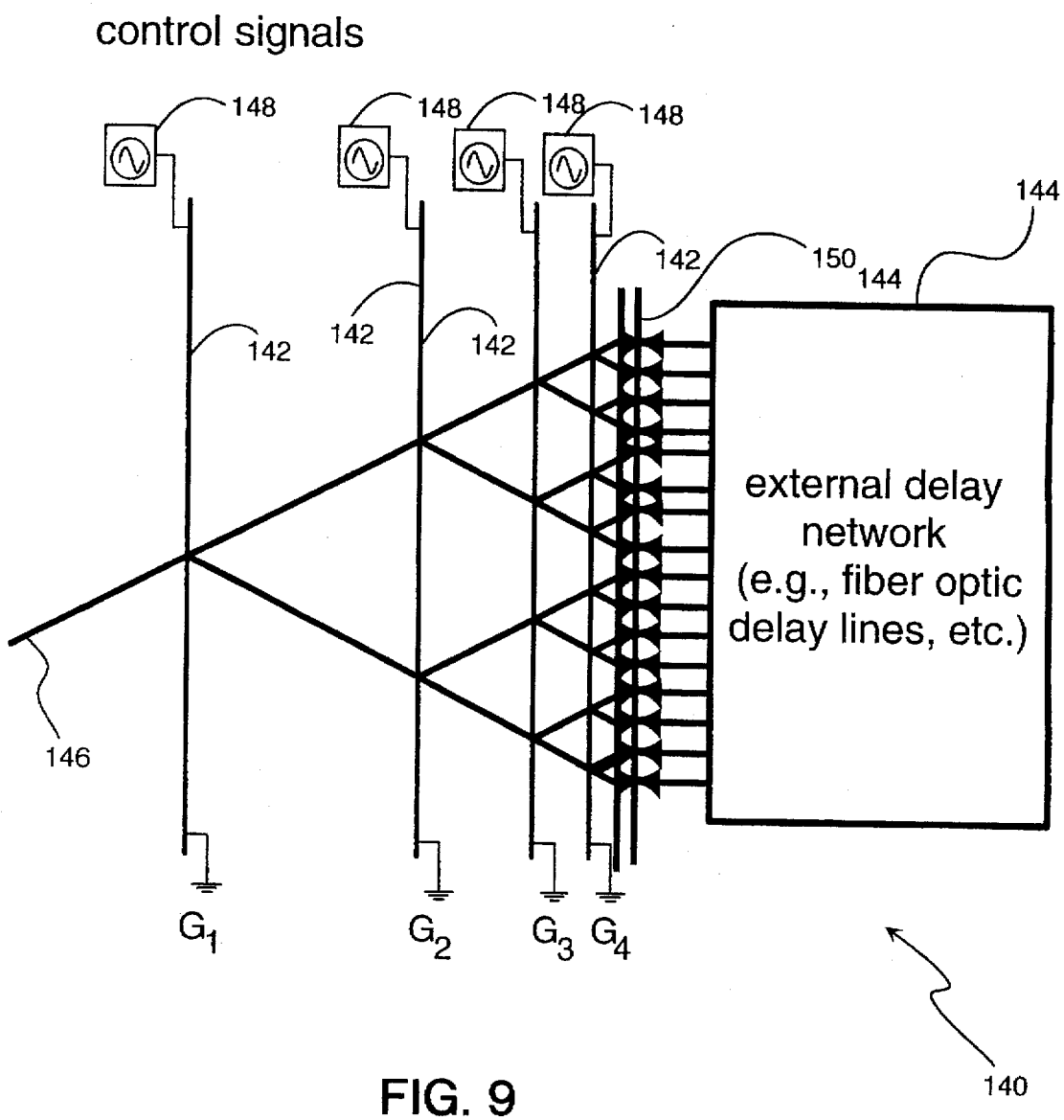
FIG. 9 is a schematic representation of an optical routing system of this invention utilized in conjunction with an auxiliary time delay network.

Another embodiment of this invention is illustrated in FIG. 9 of the drawings in which the present invention is utilized as a digital optical spatial router. In lower frequency or large aperture true time delay applications, delays of many nanoseconds may be required. Since the time delay created in these devices is due to additional optical paths that are digitally added to the optical carrier, delays in the nanosecond regime can cause the configuration that is shown in FIG. 1 to become physically large in two dimensions (although using multiple angles as shown in FIG. 6 can help maintain compactness). The constant delay optical carrier router 140 shown in FIG. 9 of the drawings is useful in this long delay regime. In this example the n cascaded switchable gratings 142 are used to select among 2n spatial locations where conventional delay lines or an external delay network 144 may be introduced. For example, if an array of 16 variable length fiber delay lines are located in delay network 144 after the free-space optical router 140 the optical carrier 146 may be routed to the desired fiber with proper setting of the 4 digital control signals 148. By introducing the saturable absorber noise suppressor 150 as described above in this coupling plane or in an ancillary image plane, the benefits of enhanced switch purity and crosstalk suppression of the free-space concept of this invention is retained.

Figure 10:
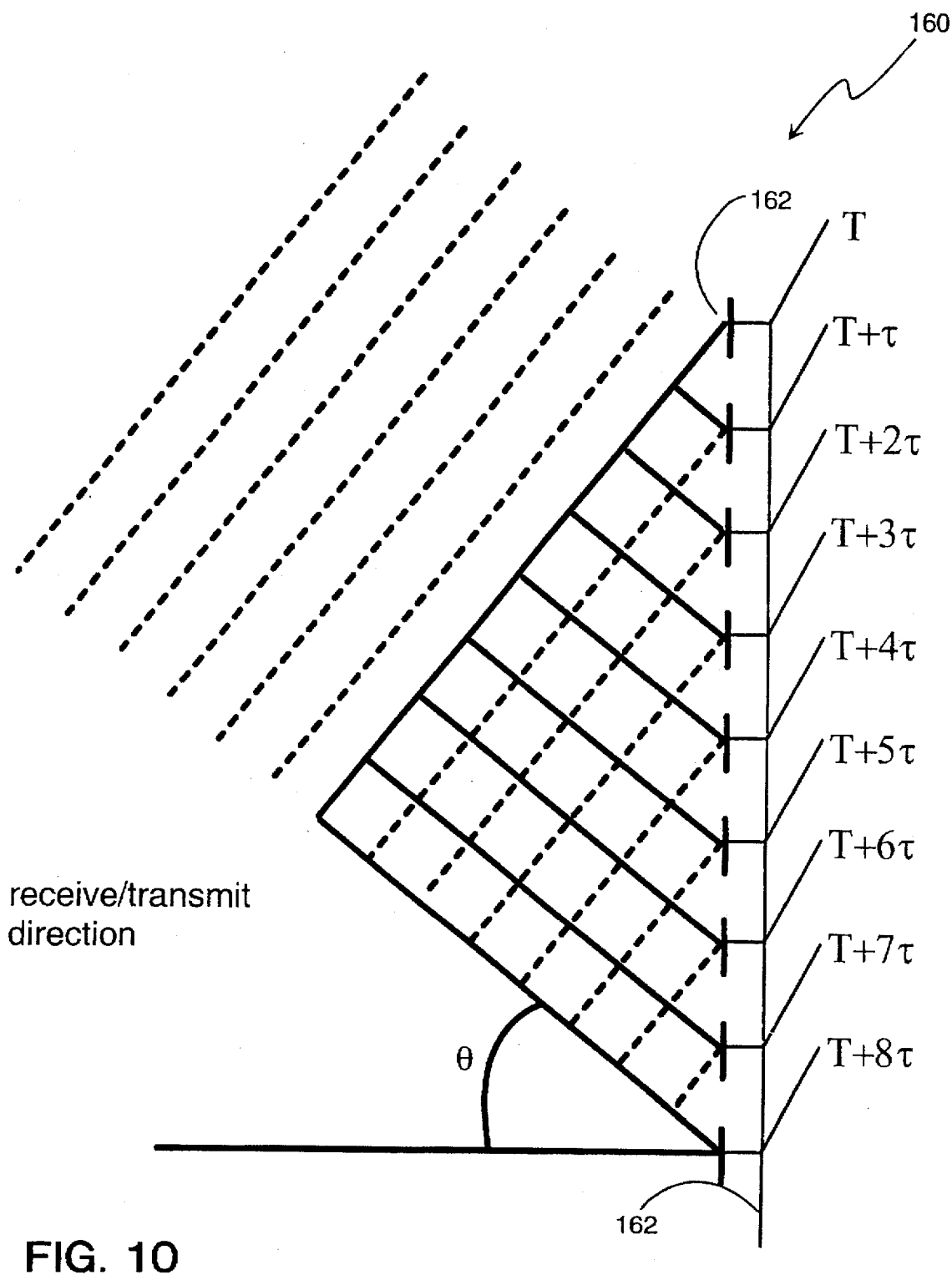
FIG. 10 is a schematic representation of a single beam steering system for a phased array antenna in which another embodiment of the optical shifter and routing system of this invention as shown in FIG. 11 can be incorporated therein.
Figure 11:
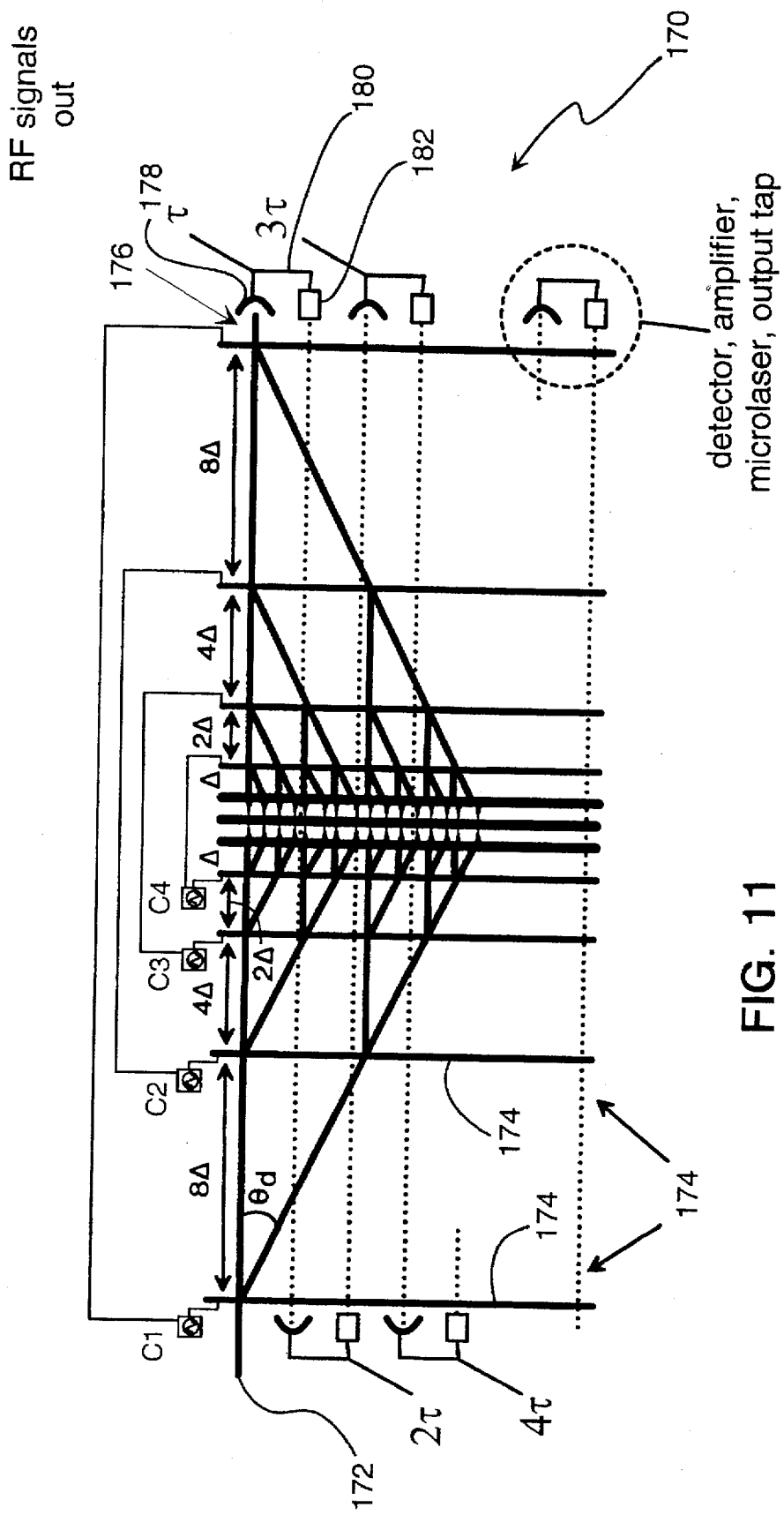
FIG. 11 is a schematic representation of a further embodiment of the optical time shifter and routing system of this invention for use within a phased array antenna.

The concept of an entire array driver utilizing the switching grating time shifter and routing system of the present invention is illustrated in FIGS. 10 and 11 of the drawings. More specifically, the free-space domain has several degrees of freedom that are more highly constrained or nonexistent in most guided wave approaches. These include the ability to readily multi-pass the configurations and to interface to other technologies. These cases are illustrated with respect to FIGS. 10 and 11.

For example, when a phased array 160 as shown in FIG. 10 is used to form a single beam at a given direction, the phase delays between each of the adjacent radiators 162 (when regularly spaced along a plane) are all identical. For this case, an unfolded version of the time shifter and routing system as shown in FIG. 1 can be used to drive an entire array, or at least to drive a number of contiguous elements in a subarray. This case, illustrated by the embodiment of the time shifter and routing system 170 shown in FIG. 11 of the drawings, depicts an optical carrier 172 propagating through the selected path as determined by the switchable gratings 174 and exits at a single spatial location 176. This signal is detected by a detector 178 to provide the signal with time delay t, and a portion 180 of the delayed signal is then amplified by amplifier 182 and re-transmitted through the same optical time shifter 170, giving a signal with delay of $2\tau$ plus a constant bias delay that can be compensated for. The process is continued to provide a series of signals with integral multiples of the digitally selected delay increment. These signals can be used to drive neighboring radiators 162 across a subset of an entire phased array using only a single configuration.

Consider a planar, 1-D phased array 160 as illustrated in FIG. 10. The basic principle on which this configuration is based is that when the beam from an array is steered to a specific direction, the signal to each of the array elements 162 is shifted in phase (or time) with respect to its neighbor by an identical delay. In FIG. 10, the bias delay to the first element is an arbitrary quantity T, and is not a factor in the array operation.

However when the array is steered at a given angle, the delay between each of the neighboring radiators is t, and thus the original signal must be obtained with integral multiples of this steering delay $\tau$, i.e., T, T+$\tau$, T+$2\tau$, T+$3\tau$, etc. In such a case, independent control of the phase shift to each element, as provided by a gang of many phase shifters (one for each array element) is overkill and not required. Rather, the series of delayed signals may be obtained by multiple passing the original signal through the single switchable delay line, as shown in FIG. 11.

The detection, amplification, and rebroadcast can be accomplished in a compact space with "smart pixel" technology where, for example, a detector, amplifier, and microlaser are located in a cell that is replicated in a dense array. Naturally noise can be a major limitation due to the multiple passes, since with repeated detection and regeneration as shown in FIG. 11 the noise accumulates—and therefore driving a vary large array in this fashion may be impractical. However applications such as backpack satellite communications require only a relatively small number of elements, and this configuration may be useful for the entire array.

These configurations can be used to drive entire arrays with small numbers of elements, or several such configurations can be used to drive subarray regions of a larger array to reduce the noise limitations. One such entire array driver is capable of steering a small array in a single dimension, and two can be used for 2-D steering.

The noise from cascaded detection-regeneration cycles can be avoided through optical amplification of the carrier after each pass or after every few passes through the system. This option would likely extend the number of passes that could be obtained for a given noise level, since cascaded detection and regeneration can be avoided entirely or reduced. Bias time delays for each pass can be equalized in optical fibers or wiring. For wide angle, 2-D steering, 2 or four units may be required depending on antenna configuration.

Figure 12B:
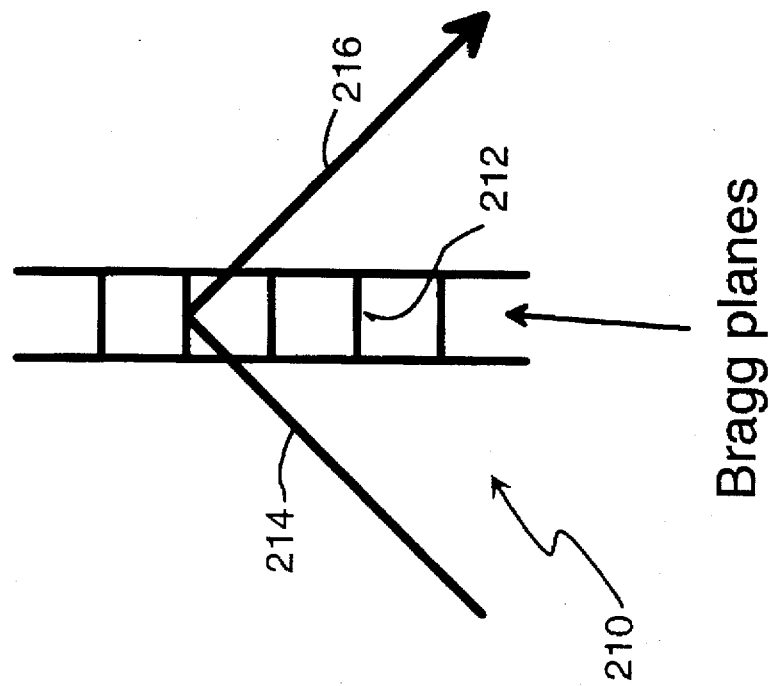
FIG. 12B is a schematic representation of a symmetric grating of the type utilized in the embodiments of this invention shown in FIGS. 13-15.
Figure 12A:
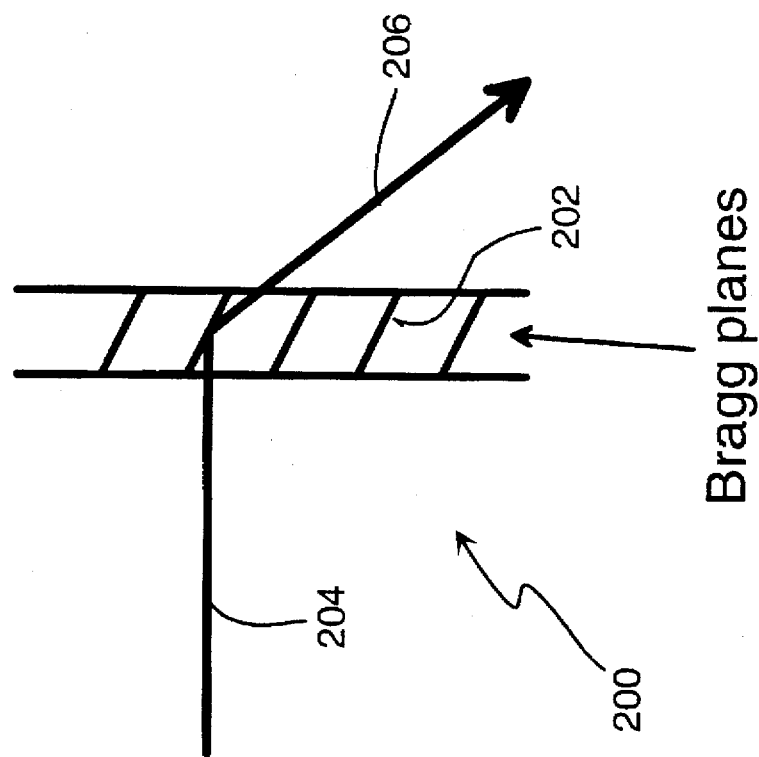
FIG. 12A is a schematic representation of an asymmetric grating of the type utilized in certain embodiments of this invention.

In another preferred embodiment of the subject invention, symmetric gratings are used to form time shifters that have improved compactness and possess many practical advantages. An asymmetric volume grating 200 is shown in FIG. 12A, where the Bragg planes 202 are tilted and the Bragg resonant incident beam 204 and diffracted beam 206 form unequal angles with respect to the grating surface normal. For the case of a symmetric volume grating 210 shown in FIG. 12B, the Bragg planes 212 are not tilted and the Bragg resonant incident beam 214 and diffracted beam 216 are symmetric with respect to the grating surface normal. Since the Bragg planes are not tilted, the fabrication of the gratings is simpler to optimize as the Bragg plane angle does not vary with shrinkage or expansion of the volume media through processing. The deviation angle between the incident and diffracted beams in the symmetric grating case can be larger, resulting in more compact configurations. Other system advantages are realized with the symmetric angles since the uniform angles of the various channels are the same throughout the system, which tends to equalize surface losses, dispersion, and retardance variation if polarization switching is used, etc.

Figure 13:
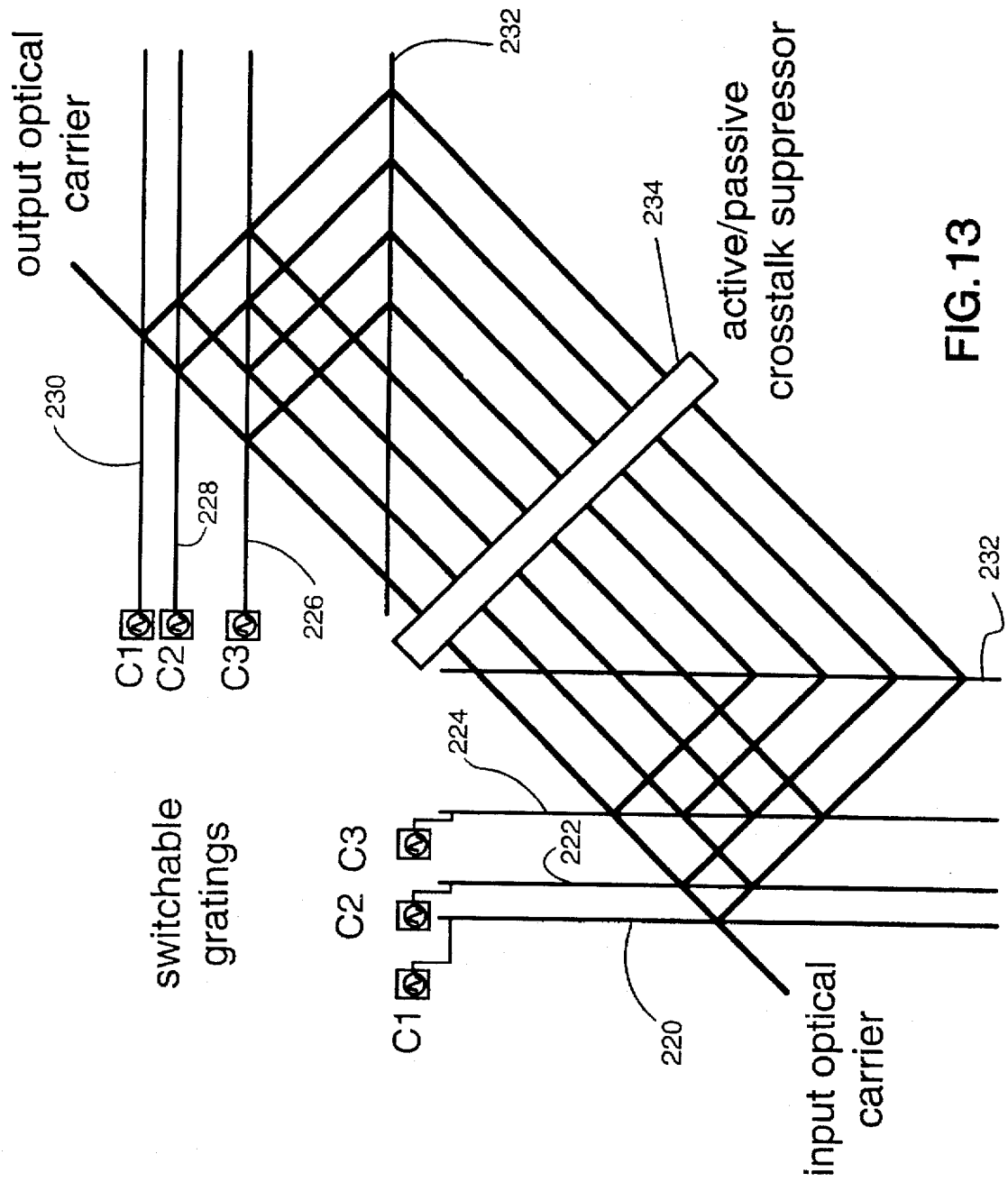
FIG. 13 is a schematic representation of a further embodiment of the optical time shifter and routing system of this invention which incorporates symmetric gratings therein.

Reference is now made to FIG. 13 of the drawings which schematically illustrates a further embodiment of the present invention in which symmetric switchable gratings are used. Here symmetric recombination gratings 226, 228, and 230 are used in combination with symmetric gratings 220, 222, and 224 as previously discussed with respect to FIGS. 1 and 4 of the drawings. A saturable absorber noise suppressor stage 234 is incorporated in the embodiment as before to decrease the spurious signal levels in the non-selected channels.

Figure 14:
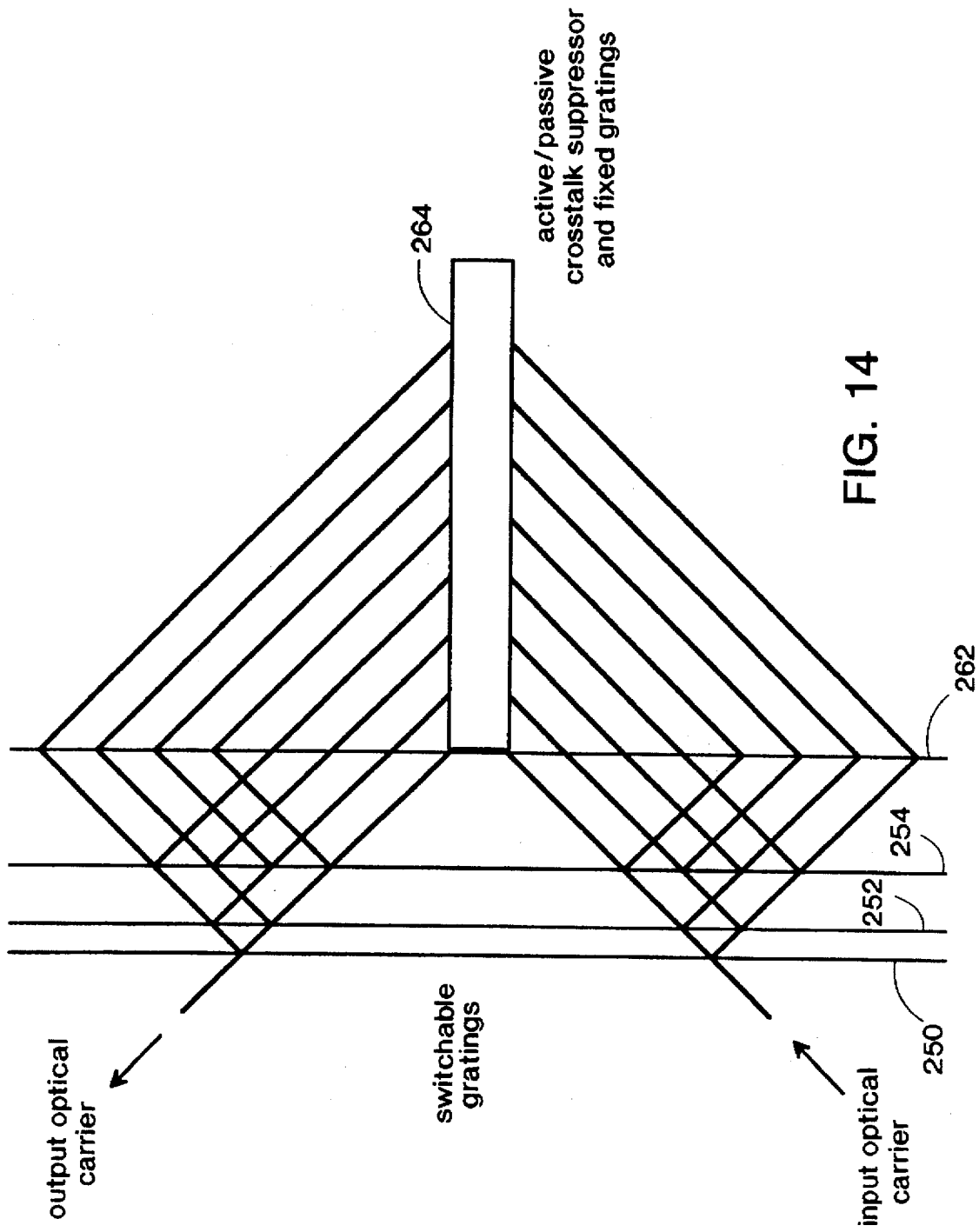
FIG. 14 is a schematic representation of a further embodiment of the optical time shifter and routing system of this invention shown in FIG. 13 which incorporates symmetric gratings therein and is configured in a compact design utilizing a single set of gratings.

Reference is now made to FIG. 14 of the drawings which schematically illustrates a further embodiment of the present invention in which symmetric switchable gratings are used in a more compact system. Here symmetric switchable gratings 250, 252, and 254 are used both for definition of the various delay paths and for recombination of the paths. Thus only one set of switchable gratings is required, while still providing for a single output beam location. The crosstalk suppressor 264 is shown with integral redirection elements such as fixed gratings.

Figure 15:
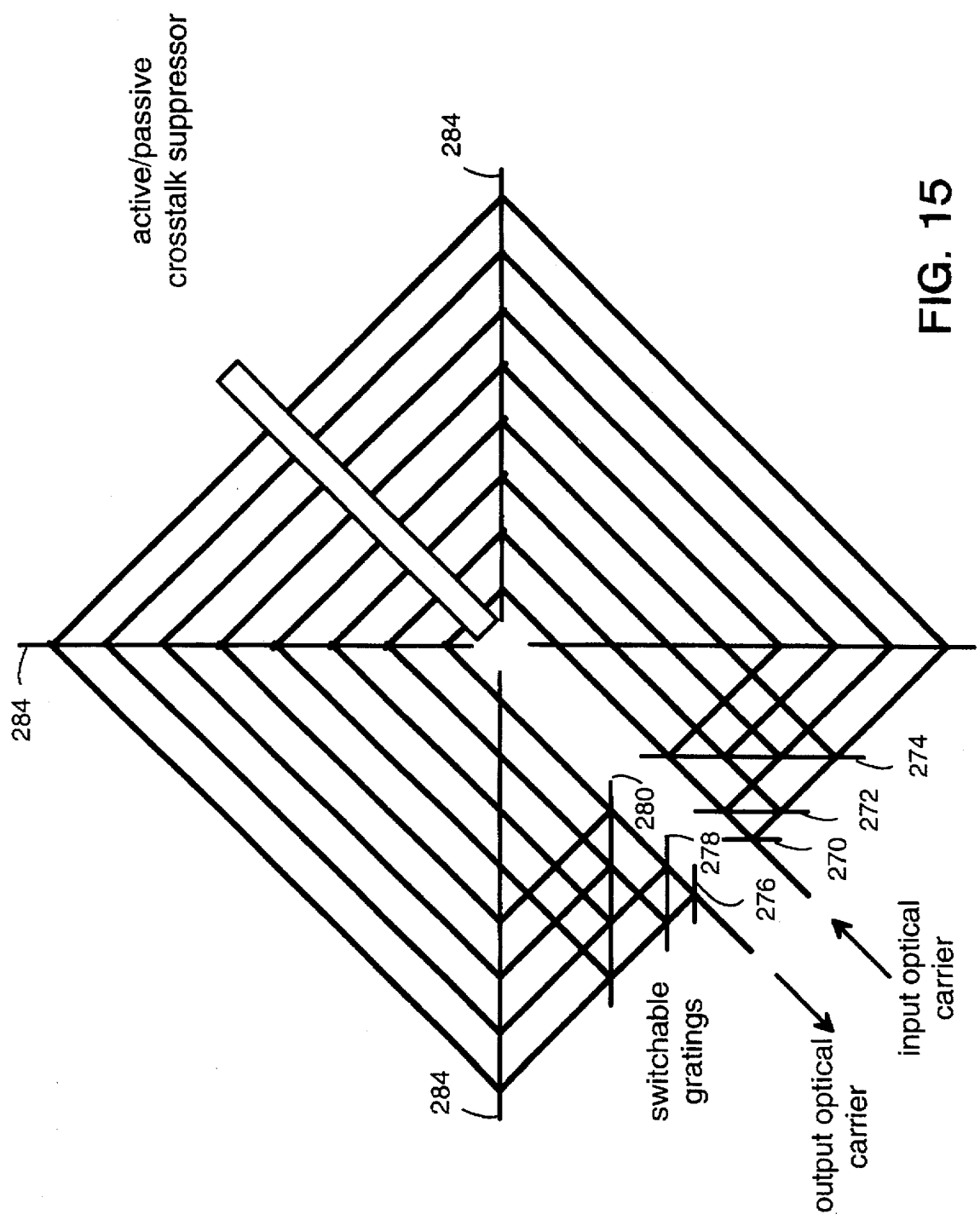
FIG. 15 is a schematic representation of a further embodiment of the optical time shifter and routing system of this invention which is even more compact than the configurations shown in FIGS. 13 and 14.

Reference is now made to FIG. 15 of the drawings which schematically illustrates a further embodiment of the present invention in which symmetric switchable gratings are used in a still more compact system. Here symmetric recombination gratings 276, 278, and 280 are used in combination with symmetric gratings 270, 272, and 274 as previously discussed with respect to FIGS. 1 and 4 of the drawings. Fixed redirection components 284 are used to wrap the configuration in a compact space. In FIGS. 13–15, optical redirection components 232, 262, and 282 are incorporated as described with component 22 of FIG. 1.

The ability to miniaturize the optical time shifter configurations of the present invention is critical to success in many applications. Using micro-optical techniques as shown in FIG. 16, many independent delay channels can be packaged in close proximity. A key limit on packing density is the optical channel (beam) diameter required to control optical crosstalk due to diffraction spreading. The longer the channels have to propagate in free space, the larger the width of the channels must be. As a rule of thumb, the channels must have a width D given by:

$$D = \sqrt{\lambda Z}$$

where $\lambda$ is the wavelength and $Z$ is the required free space propagation distance.

For example, consider a 5-bit cascade with stage separations of 1, 2, 4, and 8 mm and a diffraction angle of 45 degrees. The maximum channel length is 21.2 mm, and at a wavelength of 1.3 microns, the diffraction limited channel spacing would be approximately 0.17 mm. In that case 6 channels could be vertically stacked in a 1 mm height with a transverse dimension that is slightly larger than ½" square. This packing density tradeoff is still very good as, from diffractive crosstalk considerations only, a ½" cube should allow the containment of 76 6-bit shifters.

The miniaturezed micro-optic packaging of many independent optical time shifter configurations 300 is illustrated in FIG. 16. Here m optical time shifters or routers are stacked on top of another. Time shifter 302 is stacked on top of shifter 304, and so on to the m'th shifter configuration 308. The vertical height of each stacked layer is given by D as defined above. The optical carrier inputs 312, 314, and 318 for the 1'st, 2'nd, and m'th shifters, respectively, form a vertical column that can be interfaced to a linear array of microlasers with drive electronics.

Although the invention has been described with reference to particular embodiments, it will be understood that this invention is also capable of further and other embodiments within the spirit and scope of the appended claims.

What is claimed is:

1. An optical time shifter and routing system comprising:
   first switchable diffractive means for receiving a beam of electromagnetic radiation and for selectively directing said beam into at least first and second optical paths;
   second switchable diffractive means interposed within said optical paths for receiving said beam of electromagnetic radiation and selectively directing said beam of electromagnetic radiation following said first optical path into at least third and forth optical paths, and for selectively directing said beam of electromagnetic radiation following said second optical path into at least fifth and sixth optical paths;
   each of said optical paths being of a different predetermined length; and
   means operably associated with said first and second means for controlling the path taken by said beam of electromagnetic radiation.

2. An optical time shifter and routing system as defined in claim 1 further comprising:
   means for detecting said beam of electromagnetic radiation after having passed through a predetermined combination of said optical paths; and
   means optically aligned adjacent said detecting means for directing said beam of electromagnetic radiation after having passed through a predetermined combination of said optical paths to said detecting means.

3. An optical time shifter and routing system as defined in claim 2 further comprising means interposed between said directing means and said detecting means for suppressing unwanted signals resulting from the passage of said beam of electromagnetic radiation through said predetermined combination of said optical paths.

4. An optical time shifter and routing system as defined in claim 1 further comprising a plurality of additional beam receiving and directing means for permitting said beam of electromagnetic radiation to follow a predetermined number of further different optical paths whereby, based on the combination of optical paths through which said beam of electromagnetic radiation passes, the time said beam takes to pass therethrough is controlled.

5. An optical time shifter and routing system as defined in claim 1 wherein each of said receiving and directing means comprises a diffractive element controlled by an electrical signal.

6. An optical time shifter and routing system as defined in claim 5 wherein said diffractive element is in the form of a diffractive grating.

7. An optical time shifter and routing system as defined in claim 3 wherein said signal suppressing means is in the form of a saturable absorber using nonlinear absorption to heavily attenuate said unwanted signals while imposing negligible attenuation to the desired signal permitting it to pass onto the detecting means.

8. An optical time shifter and routing system as defined in claim 3 wherein said signal suppressing means is in the form of a saturable absorber using nonlinear absorption in quantum-well saturable absorbers to heavily attenuate said unwanted signals while imposing negligible attenuation to the desired signal permitting it to pass onto the detecting means.

9. An optical time shifter and routing system as defined in claim 2 wherein said directing means comprises a diffractive microlens array.

10. An optical time shifter and routing system as defined in claim 4 wherein each of said receiving and directing means comprises a polarization switched grating, said grating comprised of the combination of a ferroelectric liquid crystal polarization switch and a polarization sensitive holographic grating.

11. An optical time shifter and routing system as defined in claim 1 wherein said optical paths are created in free space devoid of external boundaries.

12. An optical time shifter and routing system as defined in claim 3 further comprising a plurality of additional beam receiving and directing means for permitting said beam of electromagnetic radiation to follow a predetermined number of further different optical paths whereby, based on the combination of optical paths through which said beam of electromagnetic radiation passes, the time said beam takes to reach said detector is controlled.

13. An optical time shifter and routing system as defined in claim 12 wherein each of said receiving and directing means comprises a diffractive element controlled by an electrical signal.

14. An optical time shifter and routing system as defined in claim 13 wherein said optical paths are created in free space devoid of external boundaries.

15. An optical time shifter and routing system as defined in claim 1 wherein switchable diffractive means are in the form of symmetric switchable gratings.

16. An optical time shifter and routing system comprising:

a first plurality of switchable diffractive means for receiving a beam of electromagnetic radiation from a first location and directing said beam along a plurality of different optical paths;

each of said optical paths being of different predetermined lengths;

said beam of electromagnetic radiation capable of being output from one of a plurality of different second locations;

a second plurality of switchable diffractive means for receiving said beam of electromagnetic radiation being output from one of said plurality of different second locations and directing said beam along a plurality of different optical paths to a third location; and means operably associated with said first and second plurality of means for controlling the path taken by said beam of electromagnetic radiation;

whereby, based on the combination of optical paths through which said beam of electromagnetic radiation passes, the time said beam takes to go between said first and third location is controlled.

17. An optical time shifter and routing system as defined in claim 16 further comprising means optically aligned adjacent said second locations for directing said beam of electromagnetic radiation after having passed through a predetermined combination of said optical paths to said second plurality of receiving and directing means.

18. An optical time shifter and routing system as defined in claim 17 wherein said directing means is in the form of a diffractive microlens array.

19. An optical time shifter and routing system as defined in claim 17 further comprising means interposed between said directing means and said second plurality of receiving and directing means for suppressing unwanted signals resulting from the passage of said beam of electromagnetic radiation through said predetermined combination of said optical paths.

20. An optical time shifter and routing system as defined in claim 16 wherein each of said receiving and directing means comprises a diffractive element controlled by an electrical signal.

21. An optical time shifter and routing system as defined in claim 20 wherein said diffractive element is in the form of a diffractive grating.

22. An optical time shifter and routing system as defined in claim 19 wherein said signal suppressing means is in the form of a saturable absorber using nonlinear absorption to heavily attenuate said unwanted signals while imposing negligible attenuation to the desired signal permitting it to pass onto the detecting means.

23. An optical time shifter and routing system as defined in claim 19 wherein said signal suppressing means is in the form of a saturable absorber using nonlinear absorption in quantum-well saturable absorbers to heavily attenuate said unwanted signals while imposing negligible attenuation to the desired signal permitting it to pass onto the detecting means.

24. An optical time shifter and routing system as defined in claim 16 wherein each of said receiving and directing means comprises a polarization switched grating, said grating comprised of the combination of a ferroelectric liquid crystal polarization switch and a polarization sensitive holographic grating.

25. An optical time shifter and routing system as defined in claim 16 wherein said optical paths are created in free space devoid of external boundaries.

26. An optical time shifter and routing system as defined in claim 17 wherein said optical paths are created in free space devoid of external boundaries.

27. An optical time shifter and routing system comprising:

first means for receiving a beam of electromagnetic radiation from a predetermined location and for selectively directing said beam into at least first, second and third optical paths;

second means interposed within said optical paths for receiving said beam of electromagnetic radiation and selectively directing said beam of electromagnetic radiation following said first optical path into at least forth, fifth and sixth optical paths, for selectively directing said beam of electromagnetic radiation following said second optical path into at least seventh, eighth and ninth optical paths, and for selectively directing said beam of electromagnetic radiation following said third optical path into at least tenth, eleventh and twelfth optical paths;

each of said optical paths being of a different predetermined length; and means operably associated with said first and second means for controlling the path taken by said beam of electromagnetic radiation.

28. An optical time shifter and routing system as defined in claim 27 further comprising a plurality of additional beam receiving and directing means for permitting said beam of electromagnetic radiation to follow a predetermined number of further different optical paths to another predetermined location whereby, based on the combination of optical paths through which said beam of electromagnetic radiation passes, the time said beam takes to reach said other predetermined location is controlled.

29. An optical time shifter and routing system as defined in claim 28 further comprising means interposed between a preselected pair of said receiving and directing means for suppressing unwanted signals resulting from the passage of said beam of electromagnetic radiation through said predetermined combination of said optical paths.

30. An optical time shifter and routing system as defined in claim 27 wherein each of said receiving and directing means comprises a diffractive element controlled by an electrical signal.

31. An optical time shifter and routing system as defined in claim 30 wherein said diffractive element comprises a cascaded multiple grating in a single stage.

32. An optical time shifter and routing system as defined in claim 29 wherein said signal suppressing means is in the form of a saturable absorber using nonlinear absorption to heavily attenuate said unwanted signals while imposing negligible attenuation to the desired signal passing therethrough.

33. An optical time shifter and routing system as defined in claim 29 wherein said signal suppressing means is in the form of a saturable absorber using nonlinear absorption in quantum-well saturable absorbers to heavily attenuate said unwanted signals while imposing negligible attenuation to the desired signal passing therethrough.

34. An optical time shifter and routing system as defined in claim 31 wherein each of said cascaded multiple grating comprises a pair of gratings fabricated with independent diffraction angles.

35. An optical time shifter and routing system as defined in claim 27 wherein said optical paths are created in free space devoid of external boundaries.

* * * * *